(12) United States Patent
Riviello

(10) Patent No.: US 8,709,225 B2
(45) Date of Patent: Apr. 29, 2014

(54) ELECTRODEIONIZATION DEVICE WITH PROTECTED ELECTRODES

(71) Applicant: John M. Riviello, Los Gatos, CA (US)

(72) Inventor: John M. Riviello, Los Gatos, CA (US)

(73) Assignee: Trovion Singapore Pte. Ltd., Co., Singapore (SG)

( * ) Notice: Subject to any disclaimer, the term of this patent is extended or adjusted under 35 U.S.C. 154(b) by 5 days.

(21) Appl. No.: 13/694,111

(22) Filed: Oct. 26, 2012

(65) Prior Publication Data

US 2013/0081946 A1    Apr. 4, 2013

Related U.S. Application Data

(62) Division of application No. 12/450,784, filed as application No. PCT/US2008/004930 on Apr. 17, 2008, now abandoned.

(60) Provisional application No. 60/925,249, filed on Apr. 19, 2007.

(51) Int. Cl.
    *B01D 61/48* (2006.01)

(52) U.S. Cl.
    USPC ......................................................... 204/632

(58) Field of Classification Search
    USPC ......................................................... 204/632
    See application file for complete search history.

(56) References Cited

U.S. PATENT DOCUMENTS

| | | | |
|---|---|---|---|
| 6,334,941 B1 | 1/2002 | Iwamoto | 204/632 |
| 6,824,662 B2 | 11/2004 | Liang et al. | 204/524 |
| 2003/0150732 A1 | 8/2003 | Yamanaka et al. | 204/533 |
| 2003/0213695 A1 | 11/2003 | Yamanaka et al. | 204/632 |
| 2004/0035802 A1 | 2/2004 | Emery et al. | 210/748 |
| 2004/0188258 A1 | 9/2004 | Takahashi et al. | 204/631 |
| 2006/0231403 A1 | 10/2006 | Riviello | 204/524 |
| 2008/0073215 A1* | 3/2008 | Barber et al. | 204/634 |

FOREIGN PATENT DOCUMENTS

| | | | |
|---|---|---|---|
| GB | 2396625 | 6/2004 | C02F 1/469 |
| WO | WO 2004/024992 | 3/2004 | C25B 9/00 |

OTHER PUBLICATIONS

"Supplemental European Search Report and Written Opinion in PCT Application No. PCT/US2008/004930", Mar. 23, 2012, 12 pages.

* cited by examiner

*Primary Examiner* — Arun S Phasge
(74) *Attorney, Agent, or Firm* — Shirley L. Church, Esq.

(57) ABSTRACT

The present invention relates generally to the deionization of liquids through the use of electrodeionization methods and apparatuses. The apparatuses may be configured to minimize the fouling of the electrode chambers and to provide continuous regeneration of the ion exchange materials. The apparatuses may be configured according to the desired levels of deionization for anions, cations, or both. Finally, methods are presented for various uses of the apparatuses.

14 Claims, 8 Drawing Sheets

ELECTRODEIONIZATION DEVICE WITH PROTECTED ELECTRODES

This application is a divisional application of U.S. application Ser. No. 12/450,784, filed Oct. 13, 2009, entitled: "Methods And Apparatus For Electrodeionization", which is currently pending; which claims priority under PCT/US2008/004930, filed Apr. 17, 2008, entitled: "Methods And Apparatus For Electrodeionization"; which claims priority under Provisional Application 60/925,249, filed on Apr. 19, 2007, entitled: "Methods And Apparatus For Electrodeionization".

FIELD OF THE INVENTION

This invention relates generally to the field deionization of liquids, in particular to water purification through deionization. More specifically, the present invention pertains to electrodeionization (EDI) apparatuses and various methods of using the same, directing liquid through the apparatuses in different ways to achieve different deionization characteristics.

BACKGROUND OF THE INVENTION

Electrodeionization (EDI) is known in the art as a process which removes ionized species from liquids, such as water, using electrically active media and an electric potential to influence ion transport. Examples of electrically active media comprise ion exchange materials and ion exchange membranes. In general "ion exchange materials" denotes solid (perhaps highly porous) materials that, when brought into contact with a liquid, cause ions in the liquid to be interchanged with ions in the exchange material. "Ion exchange membrane" or "ion selective membrane" generally denotes a membrane porous to some ions, perhaps containing ion exchange sites, and useful for controlling the flow of ions across the membrane, typically permitting the passage of some types of ions while blocking others. In general, ion exchange membranes selectively permit the transport of some types of ions and not others, and also block the passage of the bulk liquid carrying the ions. A combination of ion selective membranes and ion exchange materials are sandwiched between two electrodes (anode (+) and cathode (−)) under a direct current (DC) electric field to remove ions from the liquid. The electric field may be applied in a continuous manner or may be applied in an intermittent manner. Cationic exchange materials (or cation materials for short) can be used to remove positively charged ions, such as calcium, magnesium, sodium, among others, replacing them with hydronium ($H_3O^+$ or $H^+$) ions. Anionic exchange materials (or anion materials for short) can be used to remove negatively charged ions, such as chloride, nitrate, silica, among others, replacing them with hydroxide ions. The hydronium and hydroxide ions may subsequently be united to form water molecules. Eventually, the ion exchange materials become saturated with contaminant ions and become less effective at treating the liquid. Once these materials are significantly contaminated, high-purity liquid flowing past them may acquire trace amounts of contaminant ions by "displacement effects." In conventional deionization, the saturated (or exhausted) ion exchange media must be chemically recharged or regenerated periodically with a strong acid (for cation materials) or a strong base (for anion materials). The process of regenerating the ion exchange media with concentrated solutions of strong acids or strong bases presents considerable cost, time, safety, and waste disposal issues.

Continuous electrodeionization (CEDI), a subset of EDI, uses a combination of ion exchange materials and ion exchange membranes, and direct current in a manner so as to continuously deionize liquids and also to eliminate the need to chemically regenerate the ion exchange media. The "continuous" label of CEDI applies, to the condition wherein the electric field may be applied to the apparatus in a continuous manner while product liquid is being produced. CEDI includes processes such as continuous deionization, filled cell electrodialysis, or electrodiaresis. The ionic transport properties of electrically active media are an important separation parameter.

In the EDI apparatus illustrated FIG. 1, contaminant ions migrate through the ion depletion chambers 103, 107 and into the electrode chambers 101, 109. The ion exchange materials in the composite bed depletion chamber 105, anion depletion chamber 103 and cation depletion chamber 107 are regenerated by water splitting in the composite bed depletion chamber 105. Hydronium produced from water splitting migrates towards the cathode passing though the cation exchange membrane 106 of the composite bed depletion chamber 105, into the cation depletion chamber 107 and ultimately into the cathode chamber 109. Similarly, hydroxide produced from water splitting migrates towards the anode passing though the anion exchange membrane 104 of the composite bed depletion chamber 105, into the anion depletion chamber 103 and ultimately into the anode chamber 101. Electrochemically produced hydronium, which results from oxidation of water at the anode, maintains electroneutrality as hydroxide and contaminant anions migrate into the anode chamber. Similarly, electrochemically produced hydroxide, which results from the reduction of water at the cathode, maintains electroneutrality as hydronium and contaminant cations migrate into the cathode chamber. In the apparatus illustrated in FIG. 1, the feed water hardness must be less than about 1-2 parts-per-million (ppm) (as $CaCO_3$), otherwise precipitation of calcium as calcium carbonate or magnesium as magnesium hydroxide may occur in the cathode chamber causing an increase in device resistance or an increase in the backpressure, decreased flow, and potential plugging in the apparatus. By flowing the electrode rinse first through the anode chamber and then through the cathode chamber, the hardness problem may be reduced since the anode electrode rinse is slightly acidic and thus will help minimize precipitation of calcium carbonate and magnesium hydroxide. Still, feed water with hardness above several ppm (as $CaCO_3$) can cause problems in the apparatus. Another potential problem with this apparatus can occur in the anode chamber. Common anions such as chloride and nitrate can be oxidized in the anode chamber to form electrochemically active species ($ClO_2$ and $NO_2$, respectively). These electrochemically active species can damage the ion exchange material in the anode chamber resulting in decreased lifetime of the EDI apparatus.

Thus, there is a need for an EDI apparatus which reduces or overcomes problems arising from electrode fouling by precipitation or damage to the ion exchange materials of the electrode compartment by electrochemically active compounds (such as oxidizers) while maintaining some or all of the advantages of homogeneous-material ion depletion chambers.

FIG. 1 illustrates an EDI apparatus that may be used for "general purpose" liquid deionization. The apparatus comprises three ion depletion chambers, 103, 105, 107, and two electrode chambers, 101, 109, separated by four ion exchange membranes, 102, 104, 106, and 108. This configuration offers improved deionization capability but may add additional complexity or cost for applications where the deionization requirement is selective. For some applications, the required water purity may require the exhaustive removal of anions or cations, but not both. This is the case in many forms of chemical analysis where a specific element or ion or a group of elements or ions are of interest. For example, in ion chromatography, either anions or cations are typically analyzed using different chemistries. For anion analysis by ion chromatography, the water used to prepare eluent or dilute samples or standards should be free of all anions as any anion in the water will likely manifest itself and either affect calibration (non-zero intercept) or compromise detection by increasing background conductivity. Other examples requiring feed water sources free from specific ions are silicate analyzers, sodium analyzers or phosphate analyzers as typically used to monitor high purity water. In these applications, the primary requirement is that the feed water has concentrations of the analyte(s) at or near the lowest possible levels, typically sub-ppb (part-per-billion) or ppt (part-per-trillion). Since many of these analyzers are used on-line (continuous analysis), it is desirable to have a continuous, highly purified feed water source for the analyzer. Currently, there are no commercially available water purifiers which can easily interface with analytical instruments and supply feed water with extremely low contaminant levels of the analyte ions. Therefore, there is a need for a simple, cost-effective EDI apparatus that may be devoted to a specific purpose.

SUMMARY OF THE INVENTION

Accordingly and advantageously the present invention discloses methods and apparatuses that may address one or more of the issues discussed above. In some embodiments of the present invention, a composite bed concentrate chamber is used to collect and remove the contaminant ions from the liquid. The contaminant ions are hindered from entering the electrode chambers, thus reducing the electrode fouling associated with conventional EDI apparatuses.

In other embodiments of the present invention, the ion exchange efficiency of chambers including homogeneous ion exchange materials may be combined with the benefits of chambers or layers including composite anion-cation ion exchange materials to produce liquids with very low concentrations of contaminant ions. In some embodiments of the present invention, the interface between adjacent layers may be transverse to the applied electric field. In some embodiments of the present invention, the interface between adjacent layers may be parallel to the applied electric field.

These and other advantages are achieved in accordance with the present invention as described in detail below.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not to scale.

In the configurations disclosed below, liquid streams flow through the electrode chambers and "concentrate" chambers. In the following configurations, the electrode chambers may act as concentrate chambers or as a source of hydronium and hydroxide ions for regeneration of the ion exchange materials. As concentrate chambers, contaminant ions may eventually migrate into the electrode chambers (under the force of the applied electric field) and may be removed from the electrode chamber by a liquid flow stream. The electrode chamber flow streams may typically be directed to waste. For simplicity of the drawings, the electrode chamber and concentrate chamber rinse streams are not shown.

Figure 1:
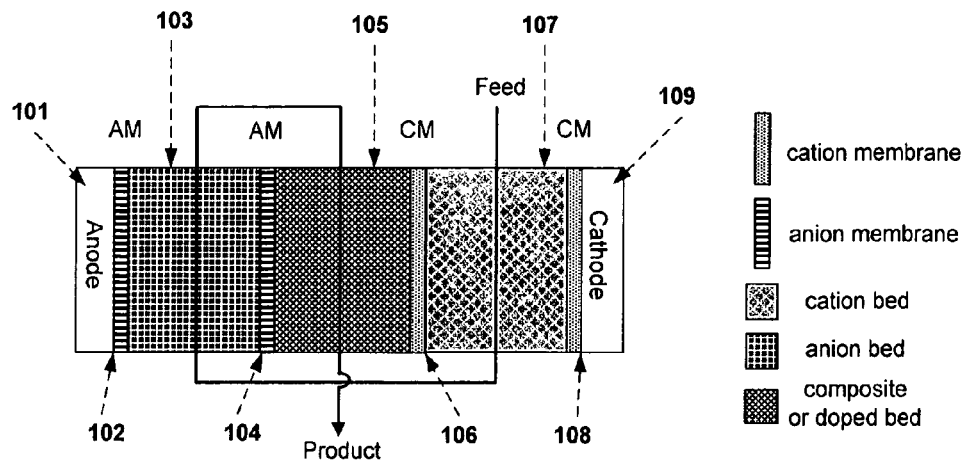

The techniques of the present invention may be readily understood by considering the following detailed description in conjunction with the accompanying drawings, in which:

FIG. 1 is a schematic representation of an EDI configuration.

FIG. 2A-2D are schematic representations of EDI configurations of embodiments of the present invention.

Figure 3A:
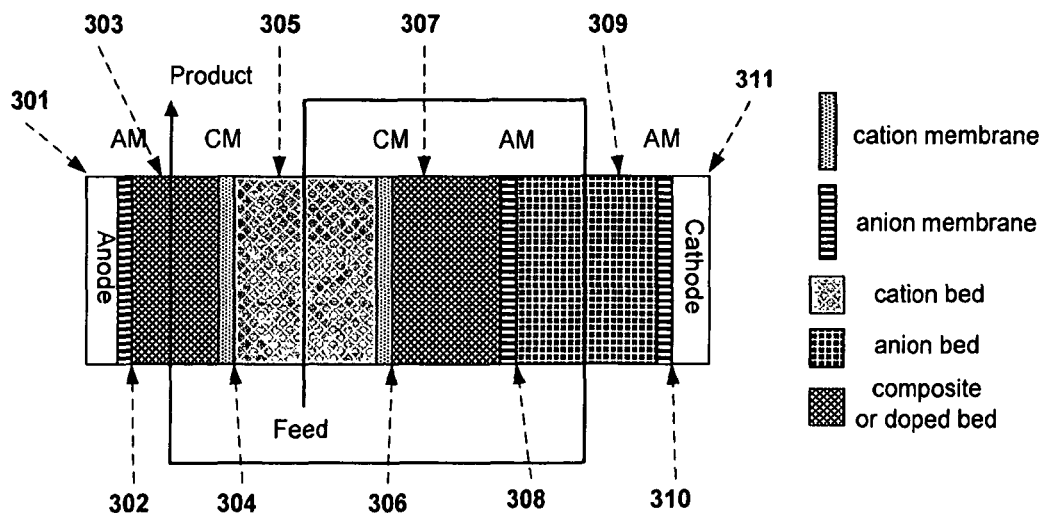
Figure 3B:
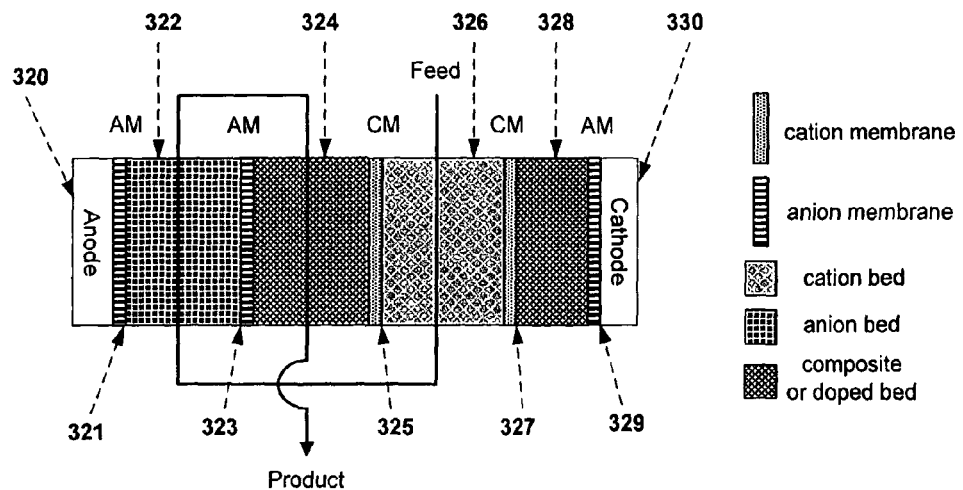
Figure 3C:
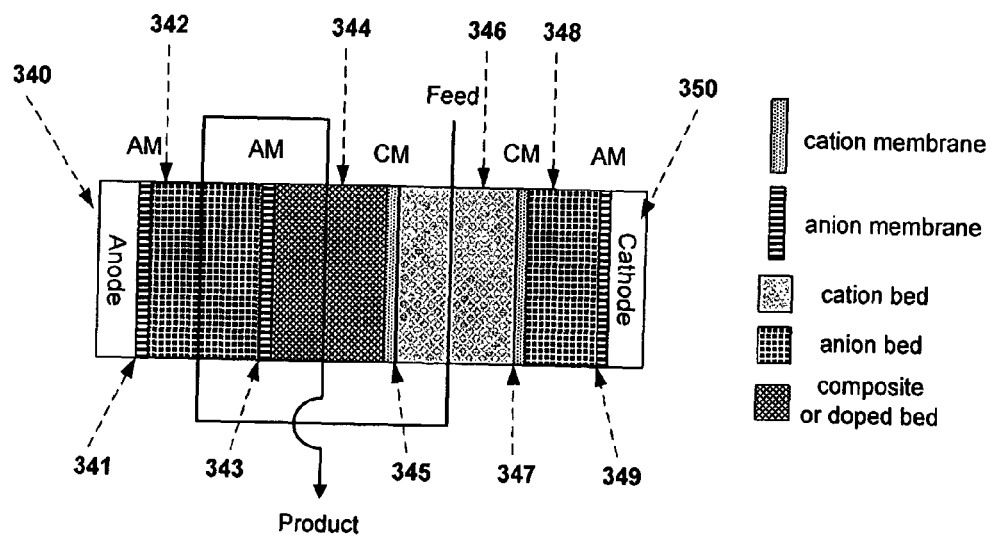

FIG. 3A-3C are schematic representations of EDI configurations of embodiments of the present invention.

Figure 4A:
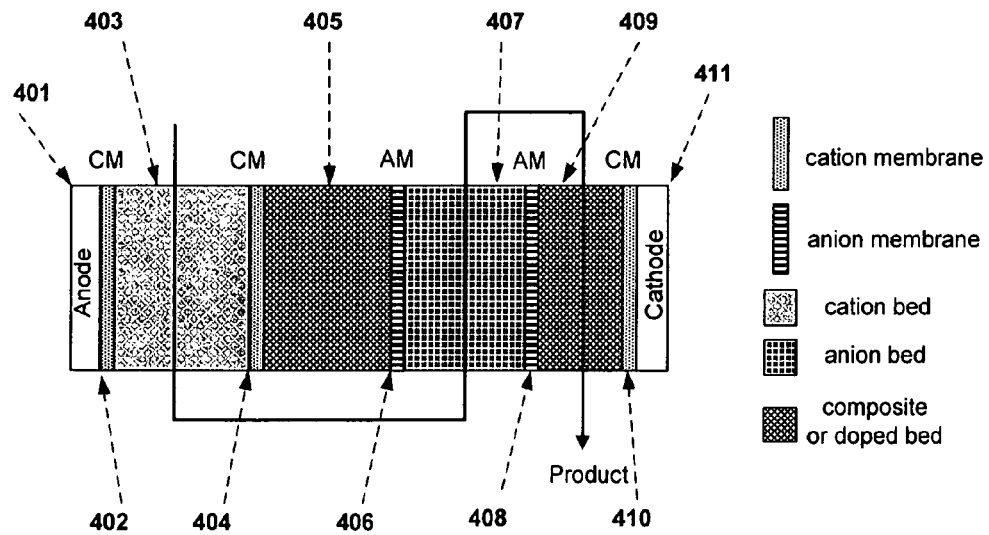
Figure 4B:
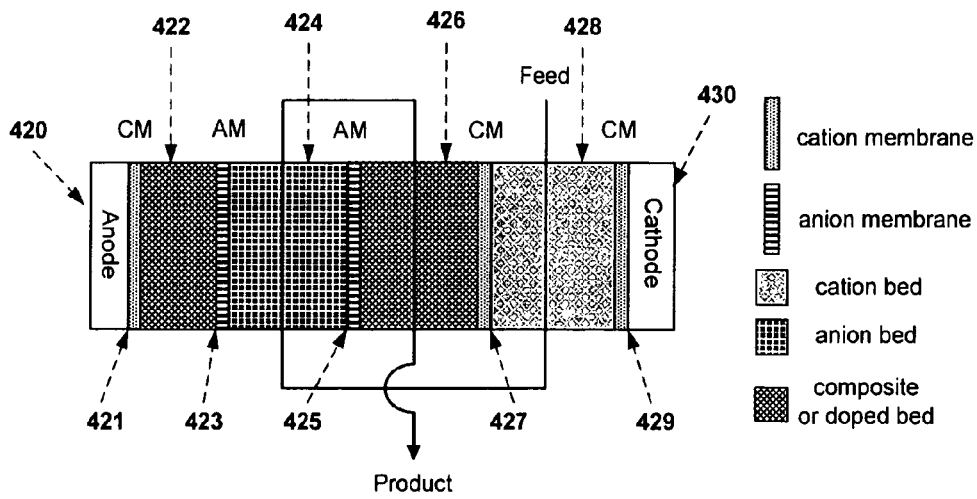
Figure 4C:
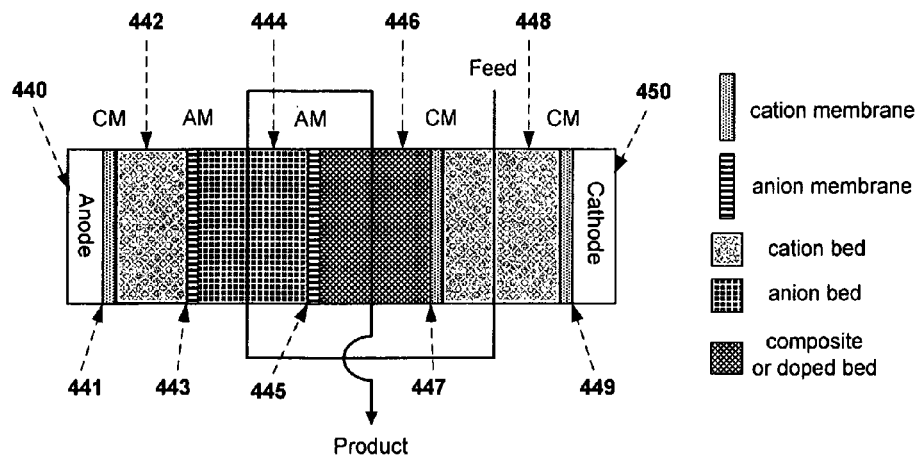

FIG. 4A-4C are schematic representations of EDI configurations of embodiments of the present invention.

Figure 5:
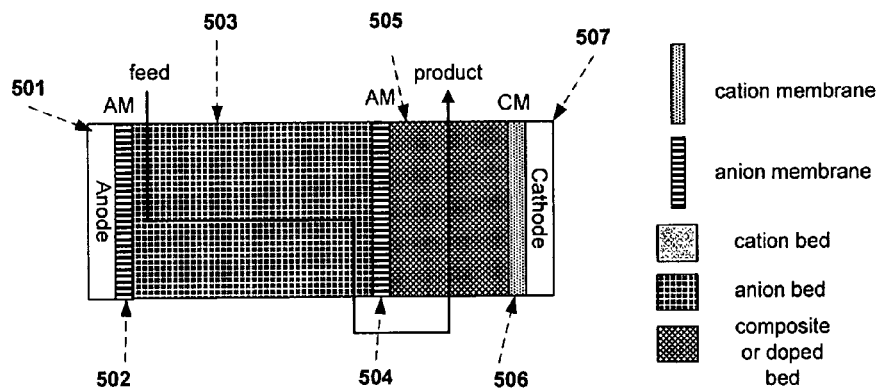

FIG. 5 is a schematic representation of an EDI configuration of one embodiment of the present invention.

Figure 6:
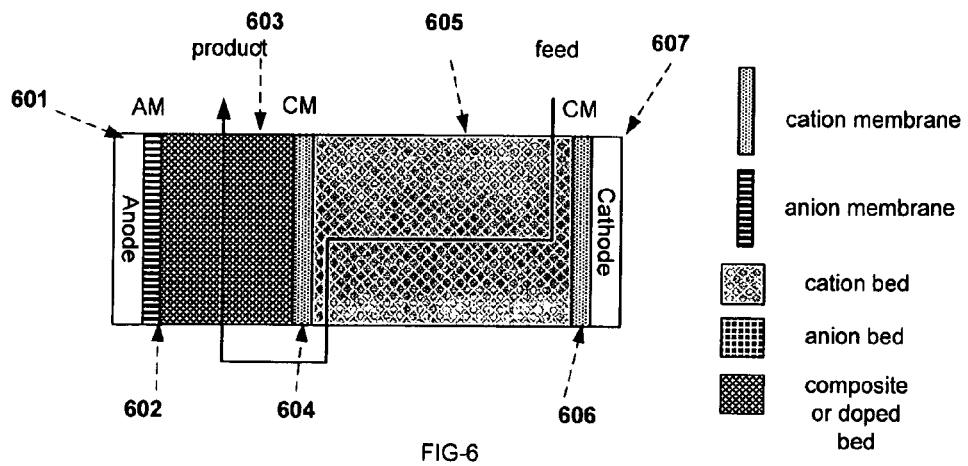

FIG. 6 is a schematic representation of an EDI configuration of one embodiment of the present invention.

Figure 7:
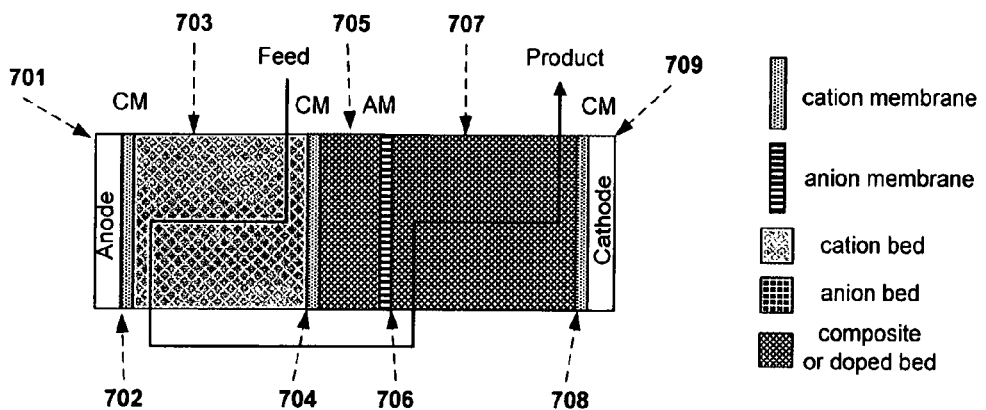

FIG. 7 is a schematic representation of an EDI configuration of one embodiment of the present invention.

Figure 8:
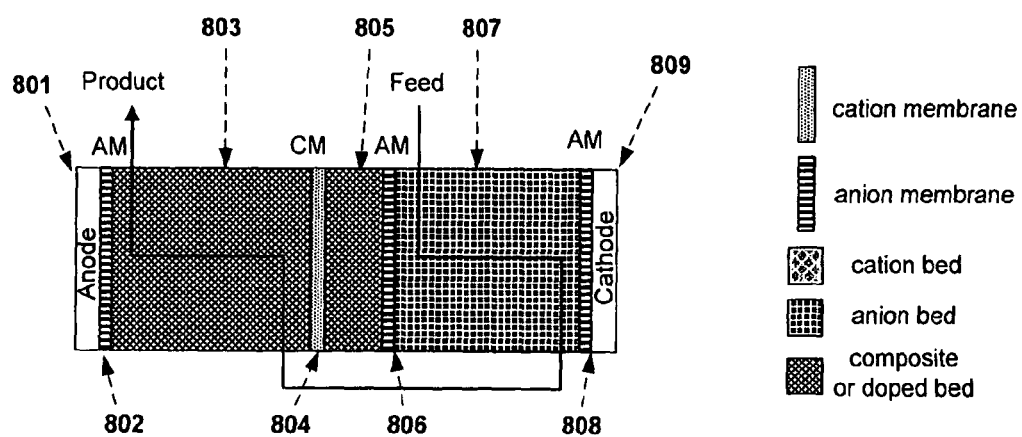

FIG. 8 is a schematic representation of an EDI configuration of one embodiment of the present invention.

DETAILED DESCRIPTION OF THE INVENTION

Abbreviations and Definitions

The following abbreviations and definitions are used herein:

The abbreviation "EDI"=electrodeionization;

The abbreviation "CEDI"=continuous electrodeionization;

The abbreviation "IC"=ion chromatography;

The abbreviation "AM"=anion exchange membrane;

The abbreviation "CM"=cation exchange membrane;

The term "applied electric field" is understood to be the electric field arising from a voltage applied between the anode and the cathode within the EDI apparatus.

In FIGS. 1-8, the anode chamber has been labeled as "anode" for brevity.

In FIGS. 1-8, the cathode chamber has been labeled as "cathode" for brevity.

The term "depletion chamber" is defined as a chamber through which the product liquid stream flows during one of the steps of the process. A depletion chamber may be filled with one of a homogeneous volume of anion exchange material, or a homogeneous volume of cation exchange material, or a mixed ion exchange material, or a doped anion exchange material, or a doped cation exchange material, or may be comprised of "layers" of various ion exchange materials.

The abbreviation "LDC"=layered depletion chamber which is a specific type of "depletion chamber" and is defined as a chamber that comprises "layers" of various ion exchange materials wherein the liquid to be processed flows through the layers in a sequential manner.

The term "concentrate chamber" is defined as a chamber wherein the product liquid stream does not flow. Typical examples of a concentrate chamber include an electrode chamber (either anode or cathode), an anodic concentrate chamber (a chamber located adjacent to the anode chamber and separated therefrom by an ion exchange membrane), or a cathodic concentrate chamber (a chamber located adjacent to the cathode chamber and separated therefrom by an ion exchange membrane), or a central concentrate chamber (wherein the concentrate chamber is not adjacent to an electrode chamber), among others. Typically, in some embodiments of the present invention, the electrode chambers (either anode or cathode), are not filled with ion exchange material.

A concentrate chamber may be filled with a mixed ion exchange material, or a doped anion exchange material, or a doped cation exchange material.

The term "mixed ion exchange material" is defined as a mixture of anion and cation exchange materials wherein the anion exchange material is responsible for about 50% of the total ion exchange capacity and the cation exchange material is responsible for about 50% of the total ion exchange capacity. The term "mixed ion exchange material" also refers to a chamber that contains a mixture of anion and cation exchange materials wherein the anion exchange material is responsible for a range of about 40% to about 60% of the total ion exchange capacity and the cation exchange material is responsible for the balance of the total ion exchange capacity. This definition is meant to be consistent with the conventional understanding of a "mixed bed" as containing a 50/50 mixture of anion/cation ion exchange materials as well as a small range, typically from −40% to −60% on either side of the 50/50 mixture.

The abbreviation "ACC"=anodic concentrate chamber which is defined as a concentrate chamber adjacent to the anode and separated from the anode by an ion exchange membrane. The ACC may contain a homogeneous volume of anion exchange material, or a homogeneous volume of cation exchange material, or a mixed ion exchange material, or a doped anion exchange material, or a doped cation exchange material. This is a chamber wherein the product liquid stream does not flow.

The abbreviation "CCC"=cathodic concentrate chamber which is defined as a concentrate chamber adjacent to the cathode and separated from the cathode by an ion exchange membrane. The CCC may contain a homogeneous volume of anion exchange material, or a homogeneous volume of cation exchange material, or a mixed ion exchange material, or a doped anion exchange material, or a doped cation exchange material. This is a chamber wherein the product liquid stream does not flow.

The abbreviation "ADC"=anion depletion chamber is defined as a chamber that includes therein a homogeneous volume of anion exchange material. These chambers have been labeled as "anion bed" in the legend of FIGS. 1-8 for brevity.

The abbreviation "CDC"=cation depletion chamber is defined as a chamber that includes therein a homogeneous volume of cation exchange material. These chambers have been labeled as "cation bed" in the legend of FIGS. 1-8 for brevity.

The abbreviation "CBCC"=composite bed concentrate chamber. A composite bed concentrate chamber may be filled with a mixed ion exchange material, or a doped anion exchange material, or a doped cation exchange material.

The abbreviation "ACBCC"=anodic composite bed concentrate chamber is defined as the composite bed concentrate chamber adjacent to the anode and separated from the anode by an ion exchange membrane. The ion exchange membrane may be an AM or a CM. The ACBCC chamber may be filled with a mixed ion exchange material, or a doped anion exchange material, or a doped cation exchange material.

The abbreviation "CCBCC"=cathodic composite bed concentrate chamber is defined as the composite bed concentrate chamber adjacent to the cathode and separated from the cathode by an ion exchange membrane. The ion exchange membrane may be an AM or a CM. The CCBCC chamber may be filled with a mixed ion exchange material, a doped anion exchange material, or a doped cation exchange material.

The abbreviation "ACBDC"=anodic composite bed depletion chamber is defined as the composite bed depletion chamber adjacent to the anode and separated from the anode by an ion exchange membrane. The ion exchange membrane may be an AM or a CM. The ACBDC chamber may be filled with a mixed ion exchange material, or a doped anion exchange material, or a doped cation exchange material.

The abbreviation "CCBDC"=cathodic composite bed depletion chamber is defined as the composite bed depletion chamber adjacent to the cathode and separated from the cathode by an ion exchange membrane. The ion, exchange membrane may be an AM or a CM. The CCBDC chamber may be filled with a mixed ion exchange material, a doped anion exchange material, or a doped cation exchange material.

The abbreviation "CBDC"=composite bed depletion chamber is defined as the composite bed depletion chamber that is not adjacent to either the cathode chamber or the anode chamber. The CBDC chamber may be filled with a mixed ion exchange material, or a doped anion exchange material, or a doped cation exchange material.

The terms "dopant" and "doping agent" refer to a material that is added to another material. In EDI, a dopant may include materials such as an inert material, an electrically active non-ion exchange material (for example, a metal material), ion exchange materials, or mixtures thereof. Typically, ion exchange material, such as anion exchange materials or cation exchange materials is added to a volume of the opposite ion exchange materials to adjust the electrical conductivity. In some instances, doping of ion exchange materials facilitate the transport of contaminant ions or may provide for water splitting which can produce regenerant ions (hydronium and hydroxide).

The term "doped cation exchange material" is defined as a composite of anion and cation exchange materials wherein the cation exchange material is responsible for at least about 60% of the total ion exchange capacity and the remainder of the total ion exchange capacity is contributed by anion exchange material. That is, the mixture is primarily a cation exchange material. This definition is meant to distinguish a "doped cation exchange material" from the conventional understanding of a "mixed ion exchange bed" (or material)". That is, "mixed ion exchange material (or bed)" is used herein to denote a bed having approximately equal cation and anion ion exchange capacities (typically equal to within about ±10%) while "doped cation exchange material" denotes an ion exchange material in which cation exchange clearly predominates and the anion exchange material is a "dopant" or minority contributor. The doped cation exchange materials may be advantageous in that they can be used to alter the conductivity through the EDI apparatus and improve the performance of the EDI apparatus.

The term "doped anion exchange material" is defined in a complimentary manner to "doped cation exchange material" described above. That is, "doped anion exchange material" is a composite of anion and cation exchange materials wherein the anion exchange material is responsible for at least about 60% of the total ion exchange capacity and the remainder of the total ion exchange capacity is contributed by the cation exchange material. That is, the mixture is primarily an anion exchange material. This definition is meant to distinguish a "doped anion exchange material" from the conventional understanding of a "mixed ion exchange bed". The doped anion exchange materials may be advantageous in that they can be used to alter the conductivity through the EDI apparatus and improve the performance of the EDI apparatus.

The terms "hard" and "hardness" when used in reference to water, indicates water that contains concentrations (typically expressed in parts-per-million, (ppm)) of various minerals, such as calcium and magnesium carbonates, bicarbonates, sulfates, or chlorides. The presence of such dissolved minerals typically arises from prolonged contact with rocky substrates and soils. Such hardness in water tends to discolor, scale, and corrode materials.

The term "scale" refers to a solid deposit on a surface in contact with a liquid in which the deposit includes mineral compounds present in the liquid, e.g., calcium carbonate.

The term "water splitting" refers to the hydrolysis of water to hydronium and hydroxide ions, which occurs at the interface of anion exchange materials and cation exchange materials in the presence of an electric potential. This is not a true electrochemical process, and differs from the electrolysis of water at an electrode in that water splitting does not produce hydrogen or oxygen gas whereas conventional electrolysis of water produces both gases.

The terms "eluant" and "eluent" refer to a substance used to effect the separation of ions from a separation column in an elution process. Examples of eluents include, but are not limited to, an acid or a base.

The term "elution" refers to the process of using an eluent to extract ions from a separation column.

The term "eluate" refers to the product or substance that is separated from a column in an elution process.

After considering the following description, those skilled in the art will clearly realize that the teachings of the invention can be readily utilized in liquid purification, specifically deionization, through the use of various EDI apparatuses and methods in various ways.

Two earlier patent applications are assigned to the Assignee of the present invention and describe five chambered EDI apparatuses. One is entitled "Method of Ion Chromatography wherein a Specialized Electrodeionization Apparatus is Used" (application Ser. No. 11/403,737) and published as US 2006/0231404. The other is entitled "Chambered Electrodeionization Apparatus with Uniform Current Density, and Method of Use" (application Ser. No. 11/403,734 and published as US 2006/0231403). The entire contents of both applications are hereby incorporated herein by reference in their entirety.

A related patent application filed concurrently herewith and entitled "Methods and Apparatus for Electrodeionization Utilizing Layered Chambers" is assigned to the Assignee of the present invention. The entire contents of this application are hereby incorporated herein by reference in its entirety.

The types of ion exchange materials that are typically of the most interest for the deionizations described herein are strong acid cation exchange materials and strong base anion exchange materials. The strong acid cation exchange material advantageously has a sulfonate-type ion exchange site (or functional group) while the anion exchange material typically has a quaternary amine ion exchange site (or functional group). There are different types of cation and anion exchange materials which are not inherently excluded from use in connection with the deionizations described herein, but one type of cation exchange material and one type of anion exchange material as described are typically found to provide adequate performance in practice and are generally used.

If the anion exchange material and cation exchange material are mixed in the desired ratio of substantially equal cation and anion exchange capacities, this is referred to as a "mixed" bed. This comports with the conventional understanding of a "mixed bed ion exchange material" as an ion exchange material that has approximately equal anion and cation exchange capacity with one type of anion exchange material and one type of cation exchange material. This is typically achieved by mixing a cation exchange material (typically a cation exchange resin) with an anion exchange material (typically an anion exchange resin) in a ratio such that the cation and anion exchange capacities of the final mixture are roughly equal. In practice, it is usually not feasible to achieve precise equality but commonly the range of anion capacity in the mixed bed can be about 40%-60% with the remaining capacity as cation capacity.

The "composite bed" concept as used herein relates to a composite as a mixture of a cation exchange material and an anion exchange material without reference to the proportions of each. That is, in a composite bed the ion exchange capacity ratio could range from about 1% to about 99% of either material, and the balance comprising the opposite material type. Generally, three types of composite beds are considered:

1. A "mixed bed" where the ratio of anion to cation ion exchange capacity is approximately 1:1 with a range of about 10% (that is, 40%-60% of either cation or anion capacity).
2. A "doped" anion bed where the anion capacity is at least about 60% and the remaining ion exchange capacity is cation.
3. A "doped" cation bed where the cation capacity is at least about 60% and the remaining ion exchange capacity is anion.

Simply put, as the proportion of cation exchange material $P_c$ in a "composite bed" is increased from about 1% to about 99% we encounter first the particular type of composite bed called a "doped anion bed" for $P_c$ less than about 40%. A "mixed bed" is produced for $P_c$ greater than about 40% and less than about 60%, and a "doped cation bed" for $P_c$ greater than about 60%.

The EDI apparatus shown in FIG. 1 is an example of an EDI apparatus, which comprises five discreet membrane bound chambers in electrical communication (although other embodiments can have more than five chambers). The apparatus illustrated in FIG. 1 comprises an anode chamber 101 separated from an ADC 103 by a first AM 102. The anode chamber 101 includes therein an anode that is typically in electrical contact with the first AM 102. The ADC 103 typically includes therein a homogeneous volume of anion exchange material. A composite bed depletion chamber (or simply CBDC) 105 may be placed on the cathode-side of the ADC 103. The ADC 103 and the CBDC 105 may be separated by a second AM 104. The CBDC 105 may include therein a mixed ion exchange material, or a doped anion exchange material, or a doped cation exchange material. The doped anion exchange material, or doped cation exchange material versions may be advantageous in that they can be used to alter the conductivity through the EDI apparatus and improve the performance of the EDI apparatus. A CDC 107 may be placed on the cathode-side of the CBDC 105. The CBDC 105 and the CDC 107 may be separated by a first CM 106. The CDC 107 typically includes therein a homogeneous volume of cation exchange material. The CDC 107 may be separated from the cathode chamber 109 by a second CM 108. The cathode chamber 109 includes therein a cathode that is typically in electrical contact with the second CM 108. When additional (more than five) membrane bound chambers are present, they may be typically present in pairs of additional homogeneous anion and cation depletion chambers, which may be added next to existing like chambers, which are present between an electrode and the CBDC 105. An electrical current runs through the EDI apparatus transverse to the membranes, conventionally from left to right for the apparatus depicted in FIG. 1 as the direction of flow of positive charges.

Each CDC may be bounded by two cation exchange membranes and typically includes a volume of homogeneous cation exchange material. The cation exchange material may comprise cation exchange resins, cation exchange particles, cation exchange fibers, cation exchange screens, cation exchange monoliths, and combinations thereof. Typically, the cation exchange material may be a volume of homogeneous cation exchange resin.

The CBDC may be bounded by a cation exchange membrane from a CDC and an anion exchange membrane from an ADC, and the chamber may contain a mixed ion exchange material, or a doped anion exchange material, or a doped cation exchange material. The ion exchange material may comprise ion exchange resins, ion exchange particles, ion exchange fibers, ion exchange screens, ion exchange monoliths, and combinations thereof.

Each ADC may be bounded by two anion exchange membranes and typically includes a volume of homogeneous anion exchange material. The anion exchange material may comprise anion exchange resins, anion exchange particles, anion exchange fibers, anion exchange screens, anion exchange monoliths, and combinations thereof. Typically, the anion exchange material may be a volume of homogeneous anion exchange resin.

The ion exchange membranes used in the CEDI apparatuses to practice some embodiments of the present invention work by passive transfer and not reactive chemistry. They may contain functional sites, which allow for the exchange of ions. The transfer of ions through the ion exchange membrane is based upon the charge of the ion. The ion exchange membranes may readily admit small ions but resist the passage of bulk liquid for example. Ion exchange membranes may be anion exchange membranes (AM) or cation exchange membranes (CM), wherein they are selective to anions or cations respectively. An AM may transport anions through the membrane, but the membrane prevents the bulk flow of liquid from one side of the membrane to the other. A CM may transport cations through the membrane, but the membrane prevents the bulk flow of liquid from one side of the membrane to the other. A property common to both types of membranes is that they must be conductive so that ions may migrate through the ion exchange membrane towards their respective electrodes.

An example of an anion exchange membrane is a microporous copolymer of styrene and divinylbenzene that has been chloromethylated and then the pendant—$CH_2Cl$ groups that were introduced to the aromatic rings were then quaternized with a tertiary amine $R_1R_2R_3N$ where $R_1$, $R_2$, and $R_3$ represent organic groups and may represent different organic groups or may represent the same organic group. This results in a membrane which may be a strong base anion exchanger. In some cases, the anion exchange membrane may also contain a binder polymer or an inert fabric. An example of an anion exchange membrane that may be used in connection with some embodiments of the present invention is the AMI-70015 membrane (a product of Membranes International, Glen Rock, N.J.). Other anion exchange membranes which provide a strong base anion exchanger may also be used.

An example of a cation exchange membrane is a microporous copolymer of styrene and divinylbenzene that has undergone sulfonation, resulting in the monosubstitution of —$SO_3H$ groups on the aromatic rings of the copolymer. This results in a membrane which may be a strong acid cation exchanger. In some cases, the cation exchange membrane may also contain a binder polymer or an inert fabric. An example of a cation exchange membrane that may be used in connection with some embodiments of the present invention is the CMI-7000S membrane (a product of Membranes International, Glen Rock, N.J.). Other cation exchange membranes which provide a strong acid cation exchanger may also be used.

The ion exchange materials used in the EDI apparatuses of the kind used to practice some embodiments of the present invention may contain functional sites, which allow for the exchange of ions. The interaction between ions and the ion exchange materials is based upon the charge of the ion. The ion exchange materials may readily admit small ions and molecules but resist the intrusion of species of even a few hundred atomic mass units. Ion exchange materials may be anion exchange materials or cation exchange materials, wherein they are selective to anions or cations respectively.

An example of an anion exchange resin is a microporous copolymer of styrene and divinylbenzene that has been chloromethylated and then the pendant —$CH_2Cl$ groups that were introduced to the aromatic rings were then quaternized with a tertiary amine $R_1R_2R_3N$ where $R_1$, $R_2$, and $R_3$ represent organic groups and may represent different organic groups or may represent the same organic group. This results in a resin which, may be a strong base anion exchanger. There are several commercially available resins of this type. One example of an anion exchange resin that may be used is the Dowex 1x4 (200 mesh) resin (a product of Dow Chemical Company, Midland, Mich.), which contains 4% divinylbenzene and is in the ionic form $Cl^-$. Other anion exchange resins which provide a strong base anion exchanger may also be used.

An example of a cation exchange resin is a microporous copolymer of styrene and divinylbenzene that has undergone sulfonation, resulting in the monosubstitution of —$SO_3H$ groups on the aromatic rings of the copolymer. This results in a resin which may be a strong acid cation exchanger. There are several commercially available resins of this type. One example of a cation exchange resin that may be used is the Dowex 50Wx4 (200 mesh) resin (a product of Dow Chemical Company, Midland, Mich.), which contains 4% divinylbenzene and is in the ionic form $H^+$. Other cation exchange resins which provide a strong acid cation exchanger may also be used.

The CBDC may serve two functions, among others. First, when an electric field is applied, water splitting occurs wherever anion and cation exchange materials are in direct contact with one another. Water splitting occurs where a cation and anion exchange material contact one another, or where a cation exchange material contacts an anion exchange membrane or where an anion exchange material contacts a cation exchange membrane. Water splitting results in the production of hydroxide and hydronium, which serve to maintain the anion exchange material in the hydroxide form and the cation exchange material in the hydronium form, respectively. As well as keeping the ion exchange materials of the CBDC fully regenerated, the hydroxide and hydronium formed at the ion exchange material/ion exchange membrane interfaces of the CBDC serve to provide hydroxide for the at least one ADC(s) and hydronium for the at least one CDC(s).

A second function of the CBDC may be to remove from the feed water, the few remaining (if any) anions not removed by the ADC and the few remaining (if any) cations not removed by the CDC. Ion transport in a composite bed ion exchange material relies on both water splitting as well as electrophoretic migration of the ion through the material. Water splitting may displace contaminant ions from the ion exchange material. These contaminant ions may be driven through the composite ion exchange material bed of the CBDC towards their respective electrode chambers. Thus, contaminant cations may be driven through the CBDC, through a CM, through the CDC(s), and through a CM, to the cathode chamber. Likewise, contaminant anions may be driven through the CBDC, through an AM, through the ADC (s), and through an AM, to the anode chamber.

Water splitting generates hydronium and hydroxide ions which may be used to regenerate ion exchange materials. Under the force of an applied electric field, water splitting can occur at the junction of anion and cation exchange materials. These junctions occur in the CBDC, since this chamber contains both anion and cation exchange materials and membranes. Hydronium from the CBDC may travel through the CM to the CDC, thus regenerating the cation exchange materials found within. Likewise, hydroxide from the CBDC may travel through the AM to the ADC, thus regenerating the anion exchange materials found within.

The following discussion will describe the movement of ions through the CBDC. For this discussion, it will be assumed that the CBDC is filled with ion exchange particles. An example of such ion exchange particles includes ion exchange resins. For a contaminant ion to be removed from the CBDC, the contaminant ion must either come in contact with the respective membrane or be retained by an ion exchange material particle in contact with a like ion exchange membrane (cation material-cation membrane or anion material-anion membrane). An ion that is in an ion eXchange material particle and electrophoretically migrating through the ion exchange material can only move to the next like particle (anion or cation exchange) if the two particles are in contact with one another, or if the contaminant ion leaves the ion exchange material particle as a result of water splitting. Since the CBDC contains a mixture of anion and cation exchange materials, it is statistically unlikely, for the typical densities of materials used in practice, that there will be a continuous path of like material particles of any significant distance, thus, electrophoretic migration in the central chamber is advantageously accompanied by displacement and retention (caused by water splitting) for efficient ion removal. This is in contrast to the mechanism of ion removal in the ADC and CDC where no water splitting occurs (since these chambers contain only one type of ion exchange material). In the ADC and CDC, contaminant ions may be removed by electrophoretic migration through the material bed to and through the ion exchange membrane and ultimately to the electrode chamber.

For example, chloride retained by the anion exchange material of the CBDC may be displaced by water splitting. The hydroxide ions formed from water splitting may displace the contaminant anions (for example $Cl^-$) from the anion exchange material and the chloride goes into solution where it is "paired" with hydronium ions from the water splitting reaction. The contaminant $Cl^-$ (as hydrochloric acid, HCl) may now move through the composite material bed where it may be retained again by anion exchange, where the displacement-retention mechanisms continue to occur. Eventually, the contaminant $Cl^-$ may come in contact with an anion exchange material particle that is in contact with the anion exchange membrane, and the contaminant $Cl^-$ ion may be passed through the AM into the ADC.

The analogous situation occurs for a cation contaminant. For example, sodium retained by the cation exchange material of the CBDC may be displaced by water splitting. The hydronium ions formed from water splitting may displace the contaminant cations (for example $Na^+$) from the cation exchange material and the cation goes into solution where it is "paired" with hydroxide ions from the water splitting reaction. The contaminant $Na^+$ (as sodium hydroxide, NaOH) may now move through the composite material bed where it may be retained again by cation exchange, where the displacement-retention mechanisms continue to occur. Eventually, the contaminant $Na^+$ may come in contact with a cation exchange material particle that is in contact with the cation exchange membrane, and thus the contaminant $Na^+$ ion may be passed through the cation membrane into the CDC.

A method for performing electrodeionization utilizing the apparatus as illustrated in FIG. 1 comprises first causing the liquid to be deionized to flow through the CDC 107. The CDC 107 may be capable of removing cations. The CDC 107 typically includes therein cation exchange materials and may be effective at removing the contaminant cations. The cations may be allowed to pass through a second CM 108 and into the cathode chamber 109. The contaminant cations may be removed from the system in the cathode chamber 109. The cations cannot travel toward the anode because of the influence of the applied electric field. Therefore, the cations may be effectively contained in the cathode chamber 109 until they are flushed from the system by the waste liquid stream that removes ions from the cathode chamber 109. The anions are attracted toward the anode under the influence of the applied electric field but will not be allowed to pass through a first CM 106 into the adjacent CBDC 105. Therefore, the anions will be retained in the liquid. The liquid exiting the CDC 107 has a reduced level of cations relative to the in-coming liquid stream.

Following passage through 107, the liquid is then flowed through the ADC 103. The ADC 103 may be capable of effectively removing contaminant anions from the liquid stream. The anions are attracted to the anode under the influence of the applied electric field and may be allowed to pass through a first AM 102 and into the anode chamber 101. The contaminant anions may be removed from the system in the anode chamber 101. The cations are not allowed to pass through a second AM 104 that defines the cathode-side of the ADC 103. The anions cannot travel toward the cathode because of the influence of the applied electric field. Therefore, the anions are effectively contained in the anode chamber 101 until they are flushed from the system by the waste liquid stream that removes ions from the anode chamber 101. Any remaining cations are largely unaffected while passing through the ADC 103. The liquid exiting the ADC 103 may be largely free of anionic contamination.

Following passage through 103, the liquid is then flowed through the CBDC 105. The CBDC 105 may be capable of effectively removing any remaining cations or anions from the liquid stream. The anions are attracted to the anode under the influence of the applied electric field and may be allowed to pass through a second AM 104 and into the ADC 103. The contaminant anions may be removed from the system in the anode chamber 101. One benefit of this configuration is that this prevents fouling and scaling of the anode chamber 101 since the anions cannot react with cations to form insoluble scaling materials (i.e., $CaCO_3$, $Mg(OH)_2$, etc.). The anions cannot travel toward the cathode because of the influence of the applied electric field. Therefore, the anions may be effectively removed in the ADC 103 or contained in the anode chamber 101 until they are flushed from the system by the waste liquid stream that removes ions from the anode chamber 101. The cations are attracted to the cathode under the influence of the applied electric field and may be allowed to pass through a first CM 106 and into the CDC 107. The contaminant cations may be removed from the system in the cathode chamber 109. The cations cannot travel toward the anode because of the influence of the applied electric field. Therefore, the cations may be effectively removed in the CDC 107 or contained in the cathode chamber 109 until they are flushed from the system by the waste liquid stream that removes ions from the cathode chamber 109.

water splitting occurs in the CBDC 105 since it may include therein a composite of anion and cation exchange materials. The water splitting in the CBDC 105 serves to regenerate the second AM 104 that separates the CBDC 105 from the ADC 103 as well as the first CM 106 that separates the CBDC 105 from the adjacent CDC 107. Additionally, hydronium ions generated by the water splitting are attracted to the cathode and enter the adjacent CDC 107 where they may be effective in regenerating the cation exchange material contained therein. Additionally, hydroxide ions generated by the water splitting are attracted to the anode and enter the adjacent ADC 103 where they may be effective in regenerating the anion exchange material contained therein.

EXAMPLE 1

An EDI device as shown in FIG. 1 was constructed using machined high density polyethylene hardware to retain the electrodes, membranes and material. In this example, the device was substantially cylindrical in shape with a substantially circular cross-section. Other shapes and cross-sections are feasible, but circular was convenient for this example. The internal flow dimensions of the ADC 103 were 1.27 cm in diameter and 3.81 cm in length. The internal flow dimensions of the CBDC 105 were 1.27 cm in diameter and 1.27 cm in length. The internal flow dimensions of the CDC 107 were 1.27 cm in diameter and 3.81 cm in length.

The anode chamber 101, for this example, contained platinum gauze electrodes (Unique Wire Weaving Inc, Hillside, N.J.). In contact with the anode and separating the anode chamber from the ADC was an anion exchange membrane 102 (AMI-7001S, a product of Membranes International, Glen Rock, N.J.). The ADC was filled with an anion exchange resin (DOWEX™ 1X4 (200 mesh), a product of The Dow Chemical Company, Midland, Mich.). An anion membrane 104 separated the ADC from the CBDC 105. The CBDC contained a doped anion material bed. The doped anion material bed consisted of a composite of an anion exchange resin (DOWEX™ 1x4 (200 mesh), a product of The Dow Chemical Company, Midland, Mich.) and a cation exchange resin (DOWEX™ 50Wx4 (200 mesh), a product of The Dow Chemical Company, Midland, Mich.) with an ion exchange capacity ratio of 3:1 anion to cation. The cation and anion exchange resins were in the hydronium and hydroxide forms, respectively. Separating the CDC 107 from the CBDC was a cation exchange membrane 106 (CMI-7000, a product of Membranes International, Glen Rock, N.J.). The CDC as filled with a cation exchange resin (DOWEX™ 50Wx4 (200 mesh), a product of The Dow Chemical Company, Midland, Mich.). The CDC was separated from the cathode chamber 109 by a cation membrane 108 (CMI-7000, a product of Membranes International, Glen Rock, N.J.). The cathode compartment contained platinum gauze electrodes (Unique Wire Weaving Inc, Hillside, N.J.). The cathode was in direct contact with the cation membrane 108 separating the CDC and cathode chamber. A pump (GP40, a product of Dionex, Sunnyvale, Calif.) was used to deliver reverse osmosis (RO) quality water (specific conductance 15.1 μS/cm, S=Siemens) at a flow rate of 2.0 mL/min to the EDI device shown in FIG. 1. A conductivity detector (CD20, a product of Dionex, Sunnyvale, Calif.) with a flow cell was used for the conductivity measurements. From the pump, the RO water flow was directed to the CDC 107, then to the ADC 103, then to the CBDC 105 and then to the flow-through conductivity cell. A peristaltic pump (MASTERFLEX LS, a product of the Cole-Parmer company, Vernon Hills, Ill.) was used to deliver deionized water at a flow rate of 2.0 mL/min to the anode chamber and then to the cathode chamber and then to waste.

Initially, the conductance of the water exiting the EDI device was 8.3 μS/cm. Using a laboratory power supply, (E3612A, a product of Agilent, Santa Clara, Calif.) a constant current of 40 mA was applied and the initial voltage was 42V. Gas evolution was observed immediately from the anode and cathode chambers. The initial background conductivity of the product water increased to 85 μS/cm and over a 1 hour period the conductivity decreased to 1.2 μS/cm. The EDI device was allowed to operate continuously for 7 days. The data in Table 1 shows results for the device of FIG. 1.

TABLE 1

Conductance Measurements vs. Time

| Hours | Voltage | Conductivity (μS/cm) |
| --- | --- | --- |
| 0.0 | 0.0 | 8.3 |
| 1 | 37 | 1.2 |
| 2 | 33 | 0.91 |
| 10 | 40 | 0.10 |
| 24 | 32 | 0.088 |
| 48 | 26 | 0.065 |
| 72 | 24 | 0.061 |
| 96 | 25 | 0.059 |
| 120 | 25 | 0.058 |
| 144 | 27 | 0.057 |
| 168 | 29 | 0.060 |

Another method (not shown) for performing electrodeionization utilizing the apparatus as illustrated in FIG. 1 comprises first causing the liquid to be deionized to flow through the ADC 103. The ADC 103 may be capable of effectively removing contaminant anions from the liquid stream. The anions are attracted to the anode under the influence of the applied electric field and may be allowed to pass through a first AM 102 and into the anode chamber 101. The contaminant anions may be removed from the system in the anode chamber 101. The anions cannot travel toward the cathode because of the influence of the applied electric field. Therefore, the anions are effectively contained in the anode chamber 101 until they are flushed from the system by the waste liquid stream that removes ions from the anode chamber 101. Any cations are largely unaffected while passing through the ADC 103. The liquid exiting the ADC 103 may be largely free of anionic contamination.

Following passage through 103, the liquid is then flowed through the CDC 107. The CDC 107 may be capable of removing cations. The CDC 107 typically includes therein cation exchange materials and may be effective at removing the contaminant cations. The cations may be allowed to pass through a second CM 108 and into the cathode chamber 109. The contaminant cations may be removed from the system in the cathode chamber 109. The cations cannot travel toward the anode because of the influence of the applied electric field. Therefore, the cations may be effectively contained in the cathode chamber 109 until they are flushed from the system by the waste liquid stream that removes ions from the cathode chamber 109. The anions are attracted toward the anode under the influence of the applied electric field but will not be allowed to pass through a first CM 106 into the adjacent CBDC 105. Therefore, the anions will be retained in the liquid. The liquid exiting the CDC 107 has a reduced level of cations relative to the in-coming liquid stream.

Following passage through 107, the liquid is then flowed through the CBDC 105. The CBDC 105 may be capable of effectively removing any remaining cations or anions from the liquid stream. The anions are attracted to the anode under the influence of the applied electric field and may be allowed to pass through a second AM 104 and into the ADC 103. The contaminant anions may be removed from the system in the anode chamber 101. The anions cannot travel toward the cathode because of the influence of the applied electric field. Therefore, the anions may be effectively removed in the ADC 103 or contained in the anode chamber 101 until they are flushed from the system by the waste liquid stream that removes ions from the anode chamber 101. The cations are attracted to the cathode under the influence of the applied electric field and may be allowed to pass through a first CM 106 and into the CDC 107. The contaminant cations may be removed from the system in the cathode chamber 109. One benefit of this configuration is that this prevents fouling and scaling of the cathode chamber 109 since the cations cannot react with anions to form insoluble scaling materials (i.e., $CaCO_3$, $Mg(OH)_2$, etc.). The cations cannot travel toward the anode because of the influence of the applied electric field. Therefore, the cations may be effectively removed in the CDC 107 or contained in the cathode chamber 109 until they are flushed from the system by the waste liquid stream that removes ions from the cathode chamber 109.

Water splitting occurs in the CBDC 105 since it may include therein a mixed ion exchange material, or a doped anion exchange material, or a doped cation exchange material. The water splitting in the CBDC 105 serves to regenerate the second AM 104 that separates the CBDC 105 from the ADC 103 as well as the first CM 106 that separates the CBDC 105 from the adjacent CDC 107. Additionally, hydronium ions generated by the water splitting are attracted to the cathode and enter the adjacent CDC 107 where they may be effective in regenerating the cation exchange material contained therein. Additionally, hydroxide ions generated by the water splitting are attracted to the anode and enter the adjacent ADC 103 where they may be effective in regenerating the anion exchange material contained therein.

Figure 2A:
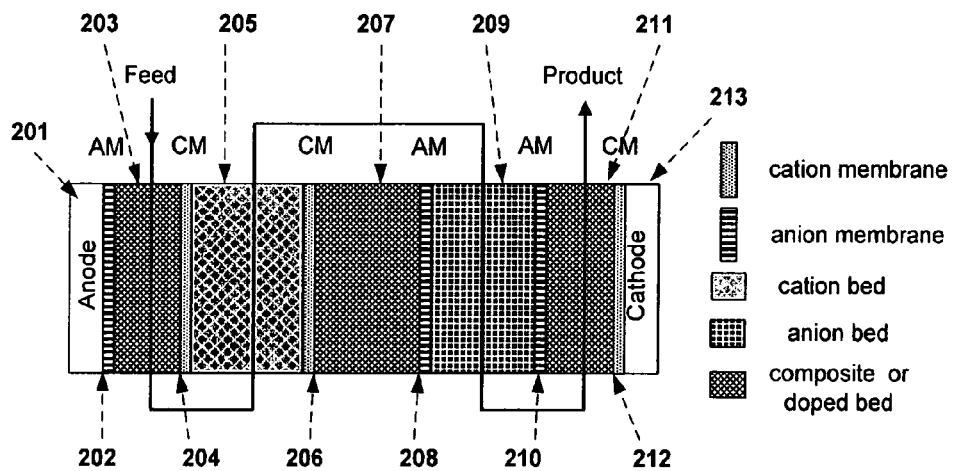
Figure 2B:
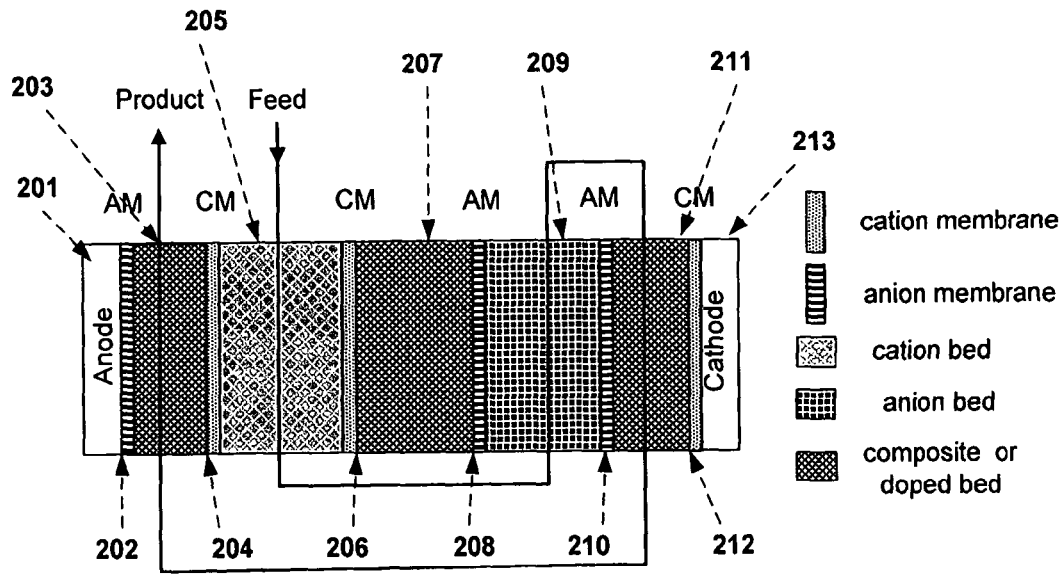

An alternative EDI apparatus is illustrated in FIGS. 2A and 2B. In this apparatus, composite bed depletion chambers may be placed adjacent to the anode and cathode chambers and separated from the electrode chambers by an AM and a CM, respectively. The composite bed depletion chamber adjacent to the anode will be defined as the anodic composite bed depletion chamber (ACBDC). The composite bed depletion chamber adjacent to the cathode will be defined as the cathodic composite bed depletion chamber (CCBDC). In each case, these composite bed depletion chambers may include therein a mixed ion exchange material, or a doped anion exchange material, or a doped cation exchange material.

The ACBDC and CCBDC depletion chambers may be capable of removing both anions and cations and may be used as a final "polishing" bed. In this configuration, the apparatus comprises two composite bed polishing chambers and most contaminant ions are received into the composite bed concentrate chamber (CBCC). Typically in this configuration, the CBCC may include therein a mixed ion exchange material, or a doped anion exchange material, or a doped cation exchange material. Depending on the application, the flow order through the depletion chambers may be varied. Water splitting occurs in the ACBDC and CCBDC which may contribute to the regeneration of these chambers as well as to the regeneration of the anion and cation depletion chambers.

The apparatus illustrated in FIG. 2A and FIG. 2B comprises an anode chamber 201 including an anode therein. An ACBDC 203 may be placed on the cathode-side of the anode chamber. The anode chamber and the ACBDC may be separated by a first AM 202. The ACBDC may include therein a mixed ion exchange material, or a doped anion exchange material, or a doped cation exchange material. A CDC 205 may be placed on the cathode-side of the ACBDC. The ACBDC and the CDC may be separated by a first CM 204. The CDC typically includes therein a homogeneous volume of cation exchange material. A CBCC 207 may be placed on the cathode-side of the CDC. The CDC and the CBCC may be separated by a second CM 206. The CBCC may include therein a mixed ion exchange material, or a doped anion exchange material, or a doped cation exchange material. An ADC 209 may be placed on the cathode-side of the CBCC. The CBCC and the ADC may be separated by a second AM 208. The ADC typically includes therein a homogeneous volume of anion exchange material. A CCBDC 211 may be placed on the cathode-side of the ADC. The ADC and the CCBDC may be separated by a third AM 210. The CCBDC may include therein a mixed ion exchange material, or a doped anion exchange material, or a doped cation exchange material. The CCBDC may be separated from a cathode chamber 213 by a third CM 212. The cathode chamber includes a cathode therein. The apparatus as illustrated in FIG. 2A and FIG. 2B may be operated in continuous mode or in intermittent mode.

A method for performing electrodeionization utilizing the apparatus as illustrated in FIGS. 2A and 2B, makes use of the flow path depicted in FIG. 2A, and comprises first causing the liquid to be deionized to flow through the ACBDC 203. The ACBDC 203 may be capable of removing both anions and cations. The anions are attracted to the adjacent anode chamber 201 under the influence of the applied electric field and may be allowed to pass through a first AM 202 and may be removed from the liquid. The cations are attracted toward the cathode under the influence of the applied electric field and may be allowed to pass through a first CM 204 into the adjacent CDC 205. The CDC 205 typically includes therein cation exchange materials and may be effective at removing the contaminant cations. The cations may be allowed to pass through a second CM 206 and into the CBCC 207. The contaminant cations may be removed from the system in the CBCC 207. The cations are not allowed to pass through a second AM 208 that defines the cathode-side of the CBCC 207. The cations cannot travel toward the anode because of the influence of the applied electric field. Therefore, the cations may be effectively contained in the CBCC 207 until they are flushed from the system by the waste liquid stream that removes ions from the CBCC 207. The liquid exiting the ACBDC 203 has a reduced level of both anions and cations relative to the in-coming liquid stream.

Water splitting occurs in the ACBDC 203 since it may include therein a mixed ion exchange material, or a doped anion exchange material, or a doped cation exchange material. The water splitting in the ACBDC 203 serves to regenerate the first AM 202 that separates the ACBDC 203 from the anode chamber 201 as well as the first CM 204 that separates the ACBDC 203 from the adjacent CDC 205. Additionally, hydronium ions generated by the water splitting are attracted to the cathode and enter the adjacent CDC 205 where they may be effective in regenerating the cation exchange material contained therein.

Following passage through 203, the liquid is then flowed through the CDC 205. The CDC 205 may be capable of effectively removing contaminant cations from the liquid stream. The cations are attracted to the cathode under the influence of the applied electric field and may be allowed to pass through a second CM 206 and into the CBCC 207. The contaminant cations may be removed from the system in the CBCC 207. The cations are not allowed to pass through a second AM 208 that defines the cathode-side of the CBCC 207. The cations cannot travel toward the anode because of the influence of the applied electric field. Therefore, the cations are effectively contained in the CBCC 207 until they are flushed from the system by the waste liquid stream that removes ions from the CBCC 207. Anions are largely unaffected while passing through the CDC 205. The liquid exiting the CDC 205 may be largely free of cationic contamination.

Following passage through 205, the liquid is then flowed through the ADC 209. The ADC 209 may be capable of effectively removing contaminant anions from the liquid stream. The anions are attracted to the anode under the influence of the applied electric field and may be allowed to pass through a second AM 208 and into the CBCC 207. The contaminant anions may be removed from the system in the CBCC 207. The anions are not allowed to pass through a second CM 206 that defines the anode-side of the CBCC 207 and into the CDC 205. One benefit of this configuration is that this prevents fouling and scaling of the cathode chamber 213 since the anions cannot react with cations to form insoluble scaling materials (i.e., $CaCO_3$, $Mg(OH)_2$, etc.). The anions cannot travel toward the cathode because of the influence of the applied electric field. Therefore, the anions may be effectively removed in the ADC 209 or contained in the CBCC 207 until they are flushed from the system by the waste liquid stream that removes ions from the CBCC 207. Cations are largely unaffected while passing through the ADC 209. The liquid exiting the ADC 209 may be largely free of anionic contamination.

Following passage through 209, the liquid is then flowed through the CCBDC 211. The CCBDC 211 may be capable of removing both anions and cations. The cations are attracted to the adjacent cathode chamber 213 under the influence of the applied electric field and may be allowed to pass through a third CM 212 and may be removed from the liquid. The anions are attracted toward the anode under the influence of the applied electric field and may be allowed to pass through a third AM 210 into the adjacent ADC 209. The ADC 209 typically includes therein anion exchange materials and may be effective at removing the contaminant anions. The anions may be allowed to pass through a second AM 208 and into the CBCC 207. The contaminant anions may be removed from the system in the CBCC 207. The anions are not allowed to pass through a second CM 206 that defines the anode-side of the CBCC 207. The anions cannot travel toward the cathode because of the influence of the applied electric field. Therefore, the anions may be effectively removed in the ADC 209 or contained in the CBCC 207 until they are flushed from the system by the waste liquid stream that removes ions from the CBCC 207. The liquid exiting the CCBDC 211 may have a reduced level of both anions and cations relative to the in-coming liquid stream.

Water splitting occurs in the CCBDC 211 since it may include therein a mixed ion exchange material, or a doped anion exchange material, or a doped cation exchange material. The water splitting in the CBCC 211 serves to regenerate the third CM 212 that separates the CCBDC 211 from the cathode chamber 213 as well as the third AM 210 that separates the CCBDC 211 from the adjacent ADC 209. Additionally, hydroxide ions generated by the water splitting are attracted to the anode and enter the adjacent ADC 209 where they may be effective in regenerating the anion exchange material contained therein.

The apparatus and method of use illustrated in FIG. 2A address the cathode fouling and ion exchange degradation problems common in convention EDI apparatuses since the cathode chamber may not receive the contaminant ions and water splitting in the composite bed depletion chambers generates hydronium and hydroxide ions for the regeneration of the anion membranes, cation membranes, anion exchange materials, and the cation exchange materials.

Another method (not shown) for performing electrodeionization utilizing the apparatus as illustrated in FIGS. 2A and 2B comprises reversing the flow depicted in FIG. 2A and first causing the liquid be deionized to flow through the CCBDC 211. The CCBDC 211 may be capable of removing both anions and cations. The cations are attracted to the adjacent cathode chamber 213 under the influence of the applied electric field and may be allowed to pass through a third CM 211 and may be removed from the liquid. The anions are attracted toward the anode under the influence of the applied electric field and may be allowed to pass through a third AM 210 into the adjacent ADC 209. The ADC 209 typically includes therein anion exchange materials and may be effective at removing the contaminant anions. The anions may be allowed to pass through a second AM 208 and into the CBCC 207. The contaminant anions may be removed from the system in the CBCC 207. The anions are not allowed to pass through a second CM 206 that defines the anode-side of the CBCC 207. The anions cannot travel toward the cathode because of the influence of the applied electric field. Therefore, the anions may be effectively removed in the ADC 209 or contained in the CBCC 207 until they are flushed from the system by the waste liquid stream that removes ions from the CBCC 207. The liquid exiting the CCBDC 211 may have a reduced level of both anions and cations relative to the in-coming liquid stream.

Water splitting occurs in the CCBDC 211 since it may include therein a mixed ion exchange material, or a doped anion exchange material, or a doped cation exchange material. The water splitting in the CCBDC 211 serves to regenerate the third CM 212 that separates the CCBDC 211 from the cathode chamber 213 as well as the third AM 210 that separates the CCBDC 211 from the adjacent ADC 209. Additionally, hydroxide ions generated by the water splitting are attracted to the anode and enter the adjacent ADC 209 where they may be effective in regenerating the anion exchange material contained therein.

Following passage through 211, the liquid is then flowed through the ADC 209. The ADC 209 may be capable of effectively removing contaminant anions from the liquid stream. The anions are attracted to the anode under the influence of the applied electric field and may be allowed to pass through a second AM 208 and into the CBCC 207. The contaminant anions may be removed from the system in the CBCC 207. The anions are not allowed to pass through a second CM 206 that defines the anode-side of the CBCC 207 and into the CDC 205. The anions cannot travel toward the cathode because of the influence of the applied electric field. Therefore, the anions may be effectively removed in the ADC 209 or contained in the CBCC 207 until they are flushed from the system by the waste liquid stream that removes ions from the CBCC 207. Cations are largely unaffected while passing through the ADC 209. The liquid exiting the ADC 209 may be largely free of anionic contamination.

Following passage through 209, the liquid is then flowed through the CDC 205. The CDC 205 may be capable of effectively removing contaminant cations from the liquid stream. The cations are attracted to the cathode under the influence of the applied electric field and may be allowed to pass through a second CM 206 and into the CBCC 207. The contaminant cations may be removed from the system in the CBCC 207. The cations are not allowed to pass through a second AM 208 that defines the cathode-side of the CBCC 207. The cations cannot travel toward the anode because of the influence of the applied electric field. Therefore, the cations are effectively contained in the CBCC 207 until they are flushed from the system by the waste liquid stream that removes ions from the CBCC 207. Anions are largely unaffected while passing through the CDC 205. The liquid exiting the CDC 205 may be largely free of cationic contamination.

Following passage through 205, the liquid is then flowed through the ACBDC 203. The ACBDC 203 may be capable of removing both anions and cations. The anions are attracted to the adjacent anode chamber 201 under the influence of the applied electric field and may be allowed to pass through a first AM 202 and may be removed from the liquid. The cations are attracted toward the cathode under the influence of the applied electric field and may be allowed to pass through a first CM 204 into the adjacent CDC 205. The CDC 205 typically includes therein cation exchange materials and may be effective at removing the contaminant cations. The cations may be allowed to pass through a second CM 206 and into the CBCC 207. The contaminant cations may be removed from the system in the CBCC 207. The cations are not allowed to pass through a second AM 208 that defines the cathode-side of the CBCC 207. The cations cannot travel toward the anode because of the influence of the applied electric field. Therefore, the cations may be effectively contained in the CBCC 207 until they are flushed from the system by the waste liquid stream that removes ions from the CBCC 207. The liquid exiting the ACBDC 203 has a reduced level of both anions and cations relative to the in-coming liquid stream.

Water splitting occurs in the ACBDC 203 since it may include therein a mixed ion exchange material, or a doped anion exchange material, or a doped cation exchange material. The water splitting in the ACBDC 203 serves to regenerate the first AM 202 that separates the ACBDC 203 from the anode chamber 201 as well as the first CM 204 that separates the ACBDC 203 from the adjacent CDC 205. Additionally, hydronium ions generated by the water splitting are attracted to the cathode and enter the adjacent CDC 205 where they may be effective in regenerating the cation exchange material contained therein.

The apparatus and methods of use illustrated in FIG. 2A address the anode fouling and ion exchange degradation problems common in convention EDI apparatuses since the anode chamber may not receive the contaminant ions and water splitting in the composite bed depletion chambers generates hydronium and hydroxide ions for the regeneration of the anion membranes, cation membranes, anion exchange materials, and the cation exchange materials.

Another method for performing electrodeionization utilizing the apparatus as illustrated in FIGS. 2A and 2B, makes use of the flow path depicted in FIG. 2B, and comprises first causing the liquid to be deionized to flow through the CDC 205. The CDC 205 may be capable of effectively removing contaminant cations from the liquid stream. The cations are attracted to the cathode under the influence of the applied electric field and may be allowed to pass through a second CM 206 and into the CBCC 207. The contaminant cations may be removed from the system in the CBCC 207. The cations are not allowed to pass through a second AM 208 that defines the cathode-side of the CBCC 207. The cations cannot travel toward the anode because of the influence of the applied electric field. Therefore, the cations may be effectively contained in the CBCC 207 until they are flushed from the system by the waste liquid stream that removes ions from the CBCC 207. Anions are largely unaffected while passing through the CDC 205. The liquid exiting the CDC 205 may be largely free of cationic contamination.

Following the passage through 205, the liquid is then flowed through the ADC 209. The ADC 209 may be capable of effectively removing contaminant anions from the liquid stream. The anions are attracted to the anode under the influence of the applied electric field and may be allowed to pass through a second AM 208 and into the CBCC 207. The contaminant anions may be removed from the system in the CBCC 207. The anions are not allowed to pass through a second CM 206 that defines the anode-side of the CBCC 207 and into the CDC 205. One benefit of this configuration is that the majority of anions may be removed into the CBCC 207 thus preventing the formation of oxidants such as $ClO_2$ in the anode chamber (from contaminant chloride) which may damage the ion exchange membranes. The anions cannot travel toward the cathode because of the influence of the applied electric field. Therefore, the anions may be effectively removed in the ADC 209 or contained in the CBCC 207 until they are flushed from the system by the waste liquid stream that removes ions from the CBCC 207. Cations are largely unaffected while passing through the ADC 209. The liquid exiting the ADC 209 may be largely free of anionic contamination.

Following the passage through 209, the liquid is then flowed through the CCBDC 211. The CCBDC 211 may be capable of removing both anions and cations. The cations are attracted to the adjacent cathode chamber 213 under the influence of the applied electric field and may be allowed to pass through a third CM 212 and may be removed from the liquid. The anions are attracted toward the anode under the influence of the applied electric field and may be allowed to pass through a third AM 210 into the adjacent ADC 209. The ADC 209 typically includes therein anion exchange materials and may be effective at removing the contaminant anions. The anions may be allowed to pass through a second AM 208 and into the CBCC 207. The contaminant anions may be removed from the system in the CBCC 207. The anions are not allowed to pass through a second CM 206 that defines the anode-side of the CBCC 207. The anions cannot travel toward the cathode because of the influence of the applied electric field. Therefore, the anions may be effectively removed in the ADC 209 or contained in the CBCC 207 until they are flushed from the system by the waste liquid stream that removes ions from the CBCC 207. The liquid exiting the CCBDC 211 may have a reduced level of both anions and cations relative to the in-coming liquid stream.

Water splitting occurs in the CCBDC 211 since it may include therein a mixed ion exchange material, or a doped anion exchange material, or a doped cation exchange material. The water splitting in the CCBDC 211 serves to regenerate the third CM 212 that separates the CCBDC 211 from the cathode chamber 213 as well as the third AM 210 that separates the CCBDC 211 from the adjacent ADC 209. Additionally, hydroxide ions generated by the water splitting are attracted to the anode and enter the adjacent ADC 209 where they may be effective in regenerating the anion exchange material contained therein.

Following the passage through 211, the liquid is then flowed through the ACBDC 203. The ACBDC 203 may be capable of removing both anions and cations. The anions are attracted to the adjacent anode chamber 201 under the influence of the applied electric field and may be allowed to pass through a first AM 202 and may be removed from the liquid. The cations are attracted toward the cathode under the influence of the applied electric field and may be allowed to pass through a first CM 204 into the adjacent CDC 205. The CDC 205 typically includes therein cation exchange materials and may be effective at removing the contaminant cations. The cations may be allowed to pass through a second CM 206 and into the CBCC 207. The contaminant cations may be removed from the system in the CBCC 207. The cations are not allowed to pass through a second AM 208 that defines the cathode-side of the CBCC 207. The cations cannot travel toward the anode because of the influence of the applied electric field. Therefore, the cations may be effectively contained in the CBCC 207 until they are flushed from the system by the waste liquid stream that removes ions from the CBCC 207. The liquid exiting the ACBDC 203 may have a reduced level of both anions and cations relative to the in-coming liquid stream.

Water splitting occurs in the ACBDC 203 since it may include therein a mixed ion exchange material, or a doped anion exchange material, or a doped cation exchange material. The water splitting in the ACBDC 203 serves to regenerate the first AM 202 that separates the ACBDC 203 from the anode chamber 201 as well as the first CM 204 that separates the ACBDC 203 from the adjacent CDC 205. Additionally, hydronium ions generated by the water splitting are attracted to the cathode and enter the adjacent CDC 205 where they may be effective in regenerating the cation exchange material contained therein.

Another method (not shown) for performing electrodeionization utilizing the apparatus as ilustrated in FIG. 2B comprises first causing the liquid to be deionized to flow through the ADC 209. The ADC 209 may be capable of effectively removing contaminant anions from the liquid stream. The anions are attracted to the anode under the influence of the applied electric field and may be allowed to pass through a second AM 208 and into the CBCC 207. The contaminant anions may be removed from the system in the CBCC 207. The anions are not allowed to pass through a second CM 206 that defines the anode-side of the CBCC 207 and into the CDC 205. One benefit of this configuration is that the majority of anions may be removed into the CBCC 207 thus preventing the formation of oxidants such as $ClO_2$ in the anode chamber (from contaminant chloride) which may damage the ion exchange membranes. The anions cannot travel toward the cathode because of the influence of the applied electric field. Therefore, the anions may be effectively removed in the ADC 209 or contained in the CBCC 207 until they are flushed from the system by the waste liquid stream that removes ions from the CBCC 207. Cations are largely unaffected while passing through the ADC 209. The liquid exiting the ADC 209 may be largely free of anionic contamination.

Following the passage through 209, the liquid is then flowed through the CDC 205. The CDC 205 may be capable of effectively removing contaminant cations from the liquid stream. The cations are attracted to the cathode under the influence of the applied electric field and may be allowed to pass through a second CM 206 and into the CBCC 207. The contaminant cations may be removed from the system in the CBCC 207. The cations are not allowed to pass through a second AM 208 that defines the cathode-side of the CBCC 207. The cations cannot travel toward the anode because of the influence of the applied electric field. Therefore, the cations may be effectively contained in the CBCC 207 until they are flushed from the system by the waste liquid stream that removes ions from the CBCC 207. Anions are largely unaffected while passing through the CDC 205. The liquid exiting the CDC 205 may be largely free of cationic contamination.

Following the passage through 205, the liquid is then flowed through the ACBDC 203. The ACBDC 203 may be capable of removing both anions and cations. The anions are attracted to the adjacent anode chamber 201 under the influence of the applied electric field and may be allowed to pass through a first AM 202 and may be removed from the liquid. The cations are attracted toward the cathode under the influence of the applied electric field and may be allowed to pass through a first CM 204 into the adjacent CDC 205. The CDC 205 typically includes therein cation exchange materials and may be effective at removing the contaminant cations. The cations may be allowed to pass through a second CM 206 and into the CBCC 207. The contaminant cations may be removed from the system in the CBCC 207. The cations are not allowed to pass through a second AM 208 that defines the cathode-side of the CBCC 207. The cations cannot travel toward the anode because of the influence of the applied electric field. Therefore, the cations may be effectively contained in the CBCC 207 until they are flushed from the system by the waste liquid stream that removes ions from the CBCC 207. The liquid exiting the ACBDC 203 may have a reduced level of both anions and cations relative to the in-coming liquid stream.

Water splitting occurs in the ACBDC 203 since it may include therein a mixed ion exchange material, or a doped anion exchange material, or a doped cation exchange material. The water splitting in the ACBDC 203 serves to regenerate the first AM 202 that separates the ACBDC 203 from the anode chamber 201 as well as the first CM 204 that separates the ACBDC 203 from the adjacent CDC 205. Additionally, hydronium ions generated by the water splitting are attracted to the cathode and enter the adjacent CDC 205 where they may be effective in regenerating the cation exchange material contained therein.

Following the passage through 203, the liquid is then flowed through the CCBDC 211. The CCBDC 211 may be capable of removing both anions and cations. The cations are attracted to the adjacent cathode chamber 213 under the influence of the applied electric field and may be allowed to pass through a third CM 212 and may be removed from the liquid. The anions are attracted toward the anode under the influence of the applied electric field and may be allowed to pass through a third AM 210 into the adjacent ADC 209. The ADC 209 typically includes therein anion exchange materials and may be effective at removing the contaminant anions. The anions may be allowed to pass through a second AM 208 and into the CBCC 207. The contaminant anions may be removed from the system in the CBCC 207. The anions are not allowed to pass through a second CM 206 that defines the anode-side of the CBCC 207. The anions cannot travel toward the cathode because of the influence of the applied electric field. Therefore, the anions may be effectively removed in the ADC 209 or contained in the CBCC 207 until they are flushed from the system by the waste liquid stream that removes ions from the CBCC 207. The liquid exiting the CCBDC 211 may have a reduced level of both anions and cations relative to the in-coming liquid stream.

Water splitting occurs in the CCBDC 211 since it may include therein a mixed ion exchange material, or a doped anion exchange material, or a doped cation exchange material. The water splitting in the CCBDC 211 serves to regenerate the third CM 212 that separates the CCBDC 211 from the cathode chamber 213 as well as the third AM 210 that separates the CCBDC 211 from the adjacent ADC 209. Additionally, hydroxide ions generated by the water splitting are attracted to the anode and enter the adjacent ADC 209 where they may be effective in regenerating the anion exchange material contained therein.

EXAMPLE 2

An EDI device as shown in FIG. 2B was constructed using machined high density polyethylene hardware to retain the electrodes, membranes and resin. The internal flow dimensions of the ACBDC 203 were 1.27 cm in diameter and 1.27 cm in length. The ADC 205 was 1.27 cm in diameter and 3.81 cm length. The internal flow dimensions of the CBCC 207 were 1.27 cm in diameter and 1.27 cm in length. The internal flow dimensions of the CDC 209 were 1.27 cm in diameter and 3.81 cm in length. The internal flow dimensions of the CCBDC 211 were 1.27 cm in diameter and 1.27 cm in length.

The anode chamber 201, for this example, contained platinum gauze electrodes (Unique Wire Weaving Inc, Hillside, N.J.). In contact with the anode and separating the anode chamber 201 from the ACBDC 203 was an anion exchange membrane 202 (AMI-7001S, a product of Membranes International, Glen Rock, N.J.). The ACBDC contained a homogenous mixture of cation exchange resin (DOWEX™ 50Wx4 (200 mesh), a product of The Dow Chemical Company, Midland, Mich.) and anion exchange resin (DOWEX™ 1x4 (200 mesh), a product of The Dow Chemical Company, Midland, Mich.) in the hydronium and hydroxide forms, respectively. The ion exchange capacity ratio of anion to cation was 1:1 (a mixed bed). Separating the ACBDC 203 from the CDC 205 was a cation exchange membrane 204 (CMI-7000, a product of Membranes International, Glen Rock, N.J.). The CDC was filled with a cation exchange resin (DOWEX™ 50Wx4 (200 mesh), a product of The Dow Chemical Company, Midland, Mich.). Separating the CDC 205 from the CBCC 207 was a cation exchange membrane 206 (CMI-7000, a product of Membranes International, Glen Rock, N.J.). The CBCC chamber contained a homogenous mixture of cation exchange resin (DOWEX™ 50Wx4 (200 mesh), a product of The Dow Chemical Company, Midland, Mich.) and anion exchange resin (DOWEX™ 1x4 (200 mesh), a product of The Dow Chemical Company, Midland, Mich.) in the hydronium and hydroxide forms, respectively. The ion exchange capacity ratio of anion to cation was 1:1 (a mixed bed). The CBCC 207 was separated from the ADC 209 by an anion membrane 208 (AMI-7001, a product of Membranes International, Glen Rock, N.J.). The ADC was filled with an anion exchange resin (DOWEX™ 1x4 (200 mesh), a product of The Dow Chemical Company, Midland, Mich.). The ADC 209 was separated from the CCBDC 211 by an anion exchange membrane 210 (AMI-7001, a product of Membranes International, Glen Rock, N.J.). The CCBDC was filled with a homogenous mixture cation exchange resin (DOWEX™ 50Wx4 (200 mesh), a product of The Dow Chemical Company, Midland, Mich.) and anion exchange resin (DOWEX™ 1x4 (200 mesh), a product of The Dow Chemical Company, Midland, Mich.) in the hydronium and hydroxide forms, respectively. The ion exchange capacity ratio of anion to cation was 1:1 (a mixed bed). Separating the CCBDC 211 from the cathode chamber 213 was a cation exchange membrane 212 (CMI-7000, a product of Membranes International, Glen Rock, N.J.). A pump (GP40, a product of Dionex, Sunnyvale, Calif.) was used to deliver RO quality water (specific conductance 14.3 µs/cm) at a flow rate of 3.0 mL/min to the EDI device shown in FIG. 2B. A conductivity detector (CD20, a product of Dionex, Sunnyvale, Calif.) with a flow cell was used for the conductivity measurements. From the pump, the RO water flow was directed to the CDC 205, then to the ADC 209, then the CCBDC 211, next to the ACBDC 203 and then to the flow through the conductivity cell. From the conductivity cell, the flow was directed to the anode chamber 201 and then the cathode chamber 213 and finally to waste.

Initially, the conductance of the water exiting the EDI device was 4.8 µS/cm. Using a laboratory power supply (E3612A, a product of Agilent, Santa Clara, Calif.) a constant current of 20 mA was applied and the initial voltage was 55V. Gas evolution was observed immediately from the anode and cathode chambers. The initial background conductivity of the product water increased to about 60 µS/cm and over a 1 hour period the conductivity decreased to 0.72 µS/cm. The EDI device was allowed to operate continuously for 9 days. The data in Table 2 shows results for the device of FIG. 2B.

TABLE 2

Conductance Measurements vs. Time

| Hours | Voltage | Conductivity (µS/cm) |
|---|---|---|
| 0.0 | 0.0 | 4.8 |
| 1 | 51 | 0.72 |
| 2 | 49 | 0.21 |
| 10 | 40 | 0.081 |
| 24 | 32 | 0.069 |
| 48 | 26 | 0.071 |
| 72 | 24 | 0.061 |
| 96 | 25 | 0.058 |
| 120 | 25 | 0.058 |
| 144 | 27 | 0.056 |
| 168 | 29 | 0.057 |
| 192 | 29 | 0.057 |
| 216 | 28 | 0.058 |

The apparatus and methods of use illustrated in FIG. 2B address the electrode fouling and ion exchange degradation problems since the electrode chambers may not receive the contaminant ions and water splitting in the composite bed depletion chambers generates hydronium and hydroxide ions for the regeneration of the anion membranes, cation membranes, anion exchange materials, and the cation exchange materials.

One benefit of the apparatuses and methods illustrated in FIG. 2A and FIG. 2B is that it may be possible to use "harder" (i.e., higher levels of mineral compounds) liquids (i.e., water) in the input stream without damaging the apparatus or degrading the efficiency of the apparatus. Input liquids which may contain significant concentrations of calcium, magnesium, and carbonate are problematic for conventional EDI apparatuses if these cations are removed directly to the cathode chamber. In the configurations as illustrated in FIG. 2A and FIG. 2B, the cations may be removed to the CBCC at the center of the apparatus and thereby reduces the scaling within the cathode chamber.

Figure 2C:
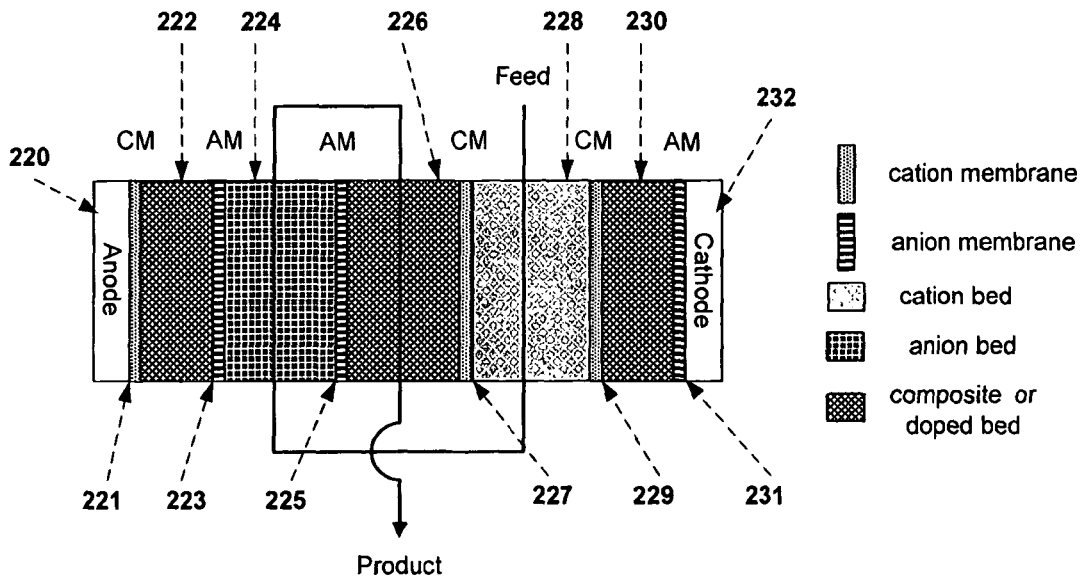

FIG. 2C illustrates an EDI apparatus that may be equivalent to FIG. 2A with the polarity of the electric field reversed (i.e. the anode and cathodes are switched). That is, the path from anode to cathode in FIG. 2C traverses the same EDI components in the same order as the path from cathode to anode in FIG. 2A. The apparatus illustrated in FIG. 2C comprises an anode chamber 220 including an anode therein. An ACBCC 222 may be placed on the cathode-side of the anode chamber. The anode chamber and the ACBCC may be separated by a first CM 221. The ACBCC may include therein a mixed ion exchange material, or a doped anion exchange material, or a doped cation exchange material. An ADC 224 may be placed on the cathode-side of the ACBCC. The ACBCC and the ADC may be separated by a first AM 223. The ADC typically includes therein a homogeneous volume of anion exchange material. A CBDC 226 may be placed on the cathode-side of the ADC. The ADC and the CBDC may be separated by a second AM 225. The CBDC may include therein a mixed ion exchange material, or a doped anion exchange material, or a doped cation exchange material. A CDC 228 may be placed on the cathode-side of the CBDC. The CBDC and the CDC may be separated by a second CM 227. The CDC typically includes therein a homogeneous volume of cation exchange material. A CCBCC 230 may be placed on the cathode-side of the CDC. The CDC and the CCBCC may be separated by a third CM 229. The CCBCC may include therein a mixed ion exchange material, or a doped anion exchange material, or a doped cation exchange material. The CCBCC may be separated from a cathode chamber 232 by a third AM 231. The cathode chamber includes a cathode therein. The apparatus as illustrated in FIG. 2C may be operated in continuous mode or in intermittent mode.

A method for performing electrodeionization utilizing the apparatus as illustrated in FIG. 2C comprises first causing the liquid to be deionized to flow through the CDC 228. The CDC 228 may be capable of removing cations. The CDC 228 typically includes therein cation exchange materials and may be effective at removing the contaminant cations. The cations may be allowed to pass through a third CM 229 and into the CCBCC 230. The contaminant cations may be removed from the system in the CCBCC 230. The cations cannot travel toward the anode because of the influence of the applied electric field. Therefore, the cations may be effectively contained in the CCBCC 230 until they are flushed from the system by the waste liquid stream that removes ions from the CCBCC 230. The anions are attracted toward the anode under the influence of the applied electric field but will not be allowed to pass through a second CM 227 into the adjacent CBDC 226. Therefore, the anions will be retained in the liquid. The liquid exiting the CDC 228 has a reduced level of both cations relative to the in coming liquid stream.

Following the passage through 228, the liquid is then flowed through the ADC 224. The ADC 224 may be capable of effectively removing contaminant anions from the liquid stream. The anions are attracted to the anode under the influence of the applied electric field and may be allowed to pass through a first AM 223 and into the ACBCC 222. The contaminant anions may be removed from the system in the ACBCC 222. The anions are not allowed to pass through a first CM 221 that defines the anode-side of the ACBCC 222. The anions cannot travel toward the cathode because of the influence of the applied electric field. Therefore, the anions are effectively contained in the ACBCC 222 until they are flushed from the system by the waste liquid stream that removes ions from the ACBCC 222. Any remaining cations are largely unaffected while passing through the ADC 224. The liquid exiting the ADC 224 may be largely free of anionic contamination.

Following the passage through 224, the liquid is then flowed through the CBDC 226. The CBDC 226 may be capable of effectively removing any remaining cations or anions from the liquid stream. The anions are attracted to the anode under the influence of the applied electric field and may be allowed to pass through a second AM 225 and into the ADC 224. The contaminant anions may be removed from the system in the ACBCC 222. The anions are not allowed to pass through a first CM 221 that defines the anode-side of the ACBCC 222 and into the anode chamber 220. One benefit of this configuration is that this prevents fouling and scaling of the anode chamber 220 since the anions cannot pass through CM 221 and into the anode chamber 220. The anions cannot travel toward the cathode because of the influence of the applied electric field. Therefore, the anions may be effectively removed in the ADC 224 or contained in the ACBCC 222 until they are flushed from the system by the waste liquid stream that removes ions from the ACBCC 222. The cations are attracted to the cathode under the influence of the applied electric field and may be allowed to pass through a second CM 227 and into the CDC 228. The contaminant cations may be removed from the system in the CCBCC 230. The cations are not allowed to pass through a third AM 231 that defines the cathode-side of the CCBCC 230 and into the cathode chamber 232. One benefit of this configuration is that this prevents fouling and scaling of the cathode chamber 232 since the cations cannot react with anions to form insoluble scaling materials (i.e., $CaCO_3$, $Mg(OH)_2$, etc.). The cations cannot travel toward the anode because of the influence of the applied electric field. Therefore, the cations may be effectively removed in the CDC 228 or contained in the CCBCC 230 until they are flushed from the system by the waste liquid stream that removes ions from the CCBCC 230. This design also reduces degradation in the anode chamber since anions do not enter anode chamber 220.

Water splitting occurs in the CBDC 226 since it may include therein a mixed ion exchange material, or a doped anion exchange material, or a doped cation exchange material. The water splitting in the CBDC 226 serves to regenerate the second AM 225 that separates the CBDC 226 from the ADC 224 as well as the second CM 227 that separates the CBDC 226 from the adjacent CDC 228. Additionally, hydronium ions generated by the water splitting are attracted to the cathode and enter the adjacent CDC 228 where they may be effective in regenerating the cation exchange material contained therein and CM 229. Additionally, hydroxide ions generated by the water splitting are attracted to the anode and enter the adjacent ADC 224 where they may be effective in regenerating the anion exchange material contained therein and AM 223.

Another method (not shown) for performing electrodeionization utilizing the apparatus as illustrated in FIG. 2C comprises first causing the liquid to be deionized to flow through the ADC. The ADC 224 may be capable of effectively removing contaminant anions from the liquid stream. The anions are attracted to the anode under the influence of the applied electric field and may be allowed to pass through a first AM 223 and into the ACBCC 222. The contaminant anions may be removed from the system in the ACBCC 222. The anions are not allowed to pass through a first CM 221 that defines the anode-side of the ACBCC 222. The anions cannot travel toward the cathode because of the influence of the applied electric field. Therefore, the anions are effectively contained in the ACBCC 222 until they are flushed from the system by the waste liquid stream that removes ions from the ACBCC 222. Any remaining cations are largely unaffected while passing through the ADC 224. The liquid exiting the ADC 224 may be largely free of anionic contamination.

Following the passage through 224, the liquid is then flowed through the CDC 228. The CDC 228 may be capable of removing cations. The CDC 228 typically includes therein cation exchange materials and may be effective at removing the contaminant cations. The cations may be allowed to pass through a third CM 229 and into the CCBCC 230. The contaminant cations may be removed from the system in the CCBCC 230. The cations cannot travel toward the anode because of the influence of the applied electric field. Therefore, the cations may be effectively contained in the CCBCC 230 until they are flushed from the system by the waste liquid stream that removes ions from the CCBCC 230. The anions are attracted toward the anode under the influence of the applied electric field but will not be allowed to pass through a second CM 227 into the adjacent CBDC 226. Therefore, the anions will be retained in the liquid. The liquid exiting the CDC 228 has a reduced level of both cations and anions relative to the in-coming liquid stream.

Following the passage through 228, the liquid is then flowed through the CBDC 226. The CBDC 226 may be capable of effectively removing any remaining cations or anions from the liquid stream. The anions are attracted to the anode under the influence of the applied electric field and may be allowed to pass through a second AM 225 and into the ADC 224 and continue through AM 223 into the ACBCC 222. The contaminant anions may be removed from the system in the ACBCC 222. The anions are not allowed to pass through a first CM 221 that defines the anode-side of the ACBCC 222 and into the anode chamber 220. One benefit of this configuration is that this prevents fouling and scaling of the anode chamber 220 since the anions cannot pass through CM 221 and enter the anode chamber 220. The anions cannot travel toward the cathode because of the influence of the applied electric field. Therefore, the anions may be effectively removed in the ADC 224 or contained in the ACBCC 222 until they are flushed from the system by the waste liquid stream that removes ions from the ACBCC 222. The cations are attracted to the cathode under the influence of the applied electric field and may be allowed to pass through a second CM 227 and into the CDC 228 and continue through CM 229 into the CCBCC 230. The contaminant cations may be removed from the system in the CCBCC 230. The cations are not allowed to pass through a third AM 231 that defines the cathode-side of the CCBCC 230 and into the cathode chamber 232. One benefit of this configuration is that this prevents fouling and scaling of the cathode chamber 232 since the cations cannot react with anions to form insoluble scaling materials (i.e., $CaCO_3$, $Mg(OH)_2$, etc.). The cations cannot travel toward the anode because of the influence of the applied electric field. Therefore, the cations may be effectively removed in the CDC 228 or contained in the CCBCC 230 until they are flushed from the system by the waste liquid stream that removes ions from the CCBCC 230.

Water splitting occurs in the CBDC 226 since it may include therein a mixed ion exchange material, or a doped anion exchange material, or a doped cation exchange material. The water splitting in the CBDC 226 serves to regenerate the second AM 225 that separates the CBDC 226 from the ADC 224 as well as the second CM 227 that separates the CBDC 226 from the adjacent CDC 228. Additionally, hydronium ions generated by the water splitting are attracted to the cathode and enter the adjacent CDC 228 where they may be effective in regenerating the cation exchange material contained therein and CM 229. Additionally, hydroxide ions generated by the water splitting are attracted to the anode and enter the adjacent ADC 224 where they may be effective in, regenerating the anion exchange material contained therein and AM 223.

Figure 2D:
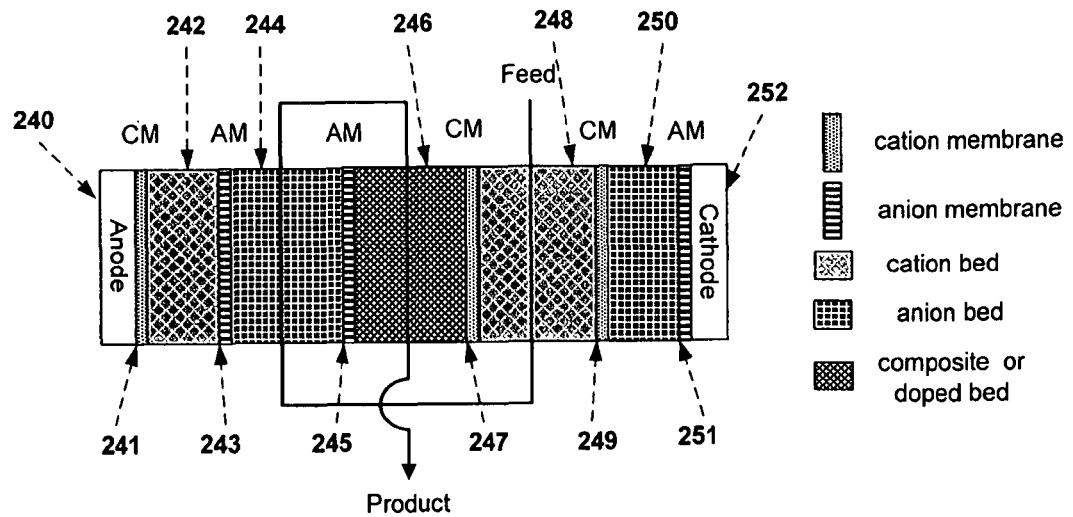

FIG. 2D illustrates an EDI apparatus that is similar to FIG. 2C except that the ACBCC chamber has been replaced with an ACC and the CCBCC has been replaced with a CCC. The apparatus illustrated in FIG. 2D comprises an anode chamber 240 including an anode therein. An ACC 242 may be placed on the cathode-side of the anode chamber. The anode chamber and the ACC may be separated by a first CM 241. The ACC typically includes therein a homogeneous volume of anion exchange material, or a homogeneous volume of cation exchange material, or a mixed ion exchange material, or a doped anion exchange material, or a doped cation exchange material. An ADC 244 may be placed on the cathode-side of the ACC. The ACC and the ADC may be separated by a first AM 243. The ADC may include therein a homogeneous volume of anion exchange material. A CBDC 246 may be placed on the cathode-side of the ADC. The ADC and the CBDC may be separated by a second AM 245. The CBDC may include therein a mixed ion exchange material, or a doped anion exchange material, or a doped cation exchange material. A CDC 248 may be placed on the cathode-side of the CBDC. The CBDC and the CDC may be separated by a second CM 247. The CDC typically includes therein a homogeneous volume of cation exchange material. A CCC 250 may be placed on the cathode-side of the CDC. The CDC and the CCC may be separated by a third CM 249. The CCC may include therein a homogeneous volume of anion exchange material, or a homogeneous volume of cation exchange material, or a mixed ion exchange material, or a doped anion exchange material, or a doped cation exchange material. The CCC may be separated from a cathode chamber 252 by a third AM 251. The cathode chamber includes a cathode therein. The apparatus as illustrated in FIG. 2D may be operated in continuous mode or in intermittent mode.

A method for performing electrodeionization utilizing the apparatus as illustrated in FIG. 2D comprises first causing the liquid to be deionized to flow through the CDC 248. The CDC 248 may be capable of removing cations. The CDC 248 typically includes therein cation exchange materials and may be effective at removing the contaminant cations. The cations may be allowed to pass through a third CM 249 and into the CCC 250. The contaminant cations may be removed from the CCC 250. The cations cannot travel toward the anode because of the influence of the applied electric field. Therefore, the cations may be effectively contained in the CCC 250 until they are flushed from the system by the waste liquid stream that removes ions from the CCC 250. The anions are attracted toward the anode under the influence of the applied electric field but will not be allowed to pass through a second CM 247 into the adjacent CBDC 246. Therefore, the anions will be retained in the liquid. The liquid exiting the CDC 248 has a reduced level of cations relative to the in-coming liquid stream.

Following the passage through 248, the liquid is then flowed through the ADC 244. The ADC 244 may be capable of effectively removing contaminant anions from the liquid stream. The anions are attracted to the anode under the influence of the applied electric field and may be allowed to pass through a first AM 243 and into the ACC 242. The contaminant anions may be removed from the system in the ACC 242. The anions are not allowed to pass through a first CM 241 that defines the anode-side of the ACC 242. The anions cannot travel toward the cathode because of the influence of the applied electric field. Therefore, the anions are effectively contained in the ACC 242 until they are flushed from the system by the waste liquid stream that removes ions from the ACC 242. Any remaining cations are largely unaffected while passing through the ADC 244. The liquid exiting the ADC 244 may be largely free of anionic contamination.

Following the passage through 244, the liquid is then flowed through the CBDC 246. The CBDC 246 may be capable of effectively removing any remaining cations or anions from the liquid stream. The anions are attracted to the anode under the influence of the applied electric field and may be allowed to pass through a second AM 245 and into the ADC 244. The contaminant anions may be removed from the system in the ACC 242. The anions are not allowed to pass through a first CM 241 that defines the anode-side of the ACC 242 and into the anode chamber 240. One benefit of this configuration is that this prevents fouling and scaling of the anode chamber 240 since the anions cannot react with cations to form insoluble scaling materials (i.e., $CaCO_3$, $Mg(OH)_2$, etc.). The anions cannot travel toward the cathode because of the influence of the applied electric field. Therefore, the anions may be effectively removed in the ADC 244 or contained in the ACC 242 until they are flushed from the system by the waste liquid stream that removes ions from the ACC 242. The cations are attracted to the cathode under the influence of the applied electric field and may be allowed to pass through a second CM 247 and into the CDC 248. The contaminant cations may be removed from the system in the CCC 250. The cations are not allowed to pass through a third AM 251 that defines the cathode-side of the CCC 250 and into the cathode chamber 252. One benefit of this configuration is that this prevents fouling and scaling of the cathode chamber 252 since the cations cannot react with anions to form insoluble scaling materials (i.e., $CaCO_3$, $Mg(OH)_2$, etc.). The cations cannot travel toward the anode because of the influence of the applied electric field. Therefore, the cations may be effectively removed in the CDC 248 or contained in the CCC 250 until they are flushed from the system by the waste liquid stream that removes ions from the CCC 250.

Water splitting occurs in the CBDC 246 since it may include therein a mixed ion exchange material, or a doped anion exchange material, or a doped cation exchange material. The water splitting in the CBDC 246 serves to regenerate the second AM 245 that separates the CBDC 246 from the ADC 244 as well as the second CM 247 that separates the CBDC 246 from the adjacent CDC 248. Additionally, hydronium ions generated by the water splitting are attracted to the cathode and enter the adjacent CDC 248 where they may be effective in regenerating the cation exchange material contained therein. Additionally, hydroxide ions generated by the water splitting are attracted to the anode and enter the adjacent ADC 244 where they may be effective in regenerating the anion exchange material contained therein.

Another method (not shown) for performing electrodeionization utilizing the apparatus as illustrated in FIG. 2D comprises first causing the liquid to be deionized to flow through the ADC. The ADC 244 may be capable of effectively removing contaminant anions from the liquid stream. The anions are attracted to the anode under the influence of the applied electric field and may be allowed to pass through a first AM 243 and into the ACC 242. The contaminant anions may be removed from the system in the ACC 242. The anions are not allowed to pass through a first CM 241 that defines the anode-side of the ACC 242. The anions cannot travel toward the cathode because of the influence of the applied electric field. Therefore, the anions are effectively contained in the ACC 242 until they are flushed from the system by the waste liquid stream that removes ions from the ACC 242. Any remaining cations are largely unaffected while passing through the ADC 244. The liquid exiting the ADC 244 may be largely free of anionic contamination.

Following the passage through 244, the liquid is then flowed through the CDC 248. The CDC 248 may be capable of removing cations. The CDC 248 typically includes therein cation exchange materials and may be effective at removing the contaminant cations. The cations may be allowed to pass through a third CM 249 and into the CCC 250. The contaminant cations may be removed from the system in the CCC 250. The cations cannot travel toward the anode because of the influence of the applied electric field. Therefore, the cations may be effectively contained in the CCC 250 until they are flushed from the system by the waste liquid stream that removes ions from the CCC 250. The anions are attracted toward the anode under the influence of the applied electric field but will not be allowed to pass through a second CM 247 into the adjacent CBDC 246. Therefore, the anions will be retained in the liquid. The liquid exiting the CDC 248 has a reduced level of both cations relative to the in-coming liquid stream.

Following the passage through 248, the liquid is then flowed through the CBDC 246. The CBDC 246 may be capable of effectively removing any remaining cations or anions from the liquid stream. The anions are attracted to the anode under the influence of the applied electric field and may be allowed to pass through a second AM 245 and into the ADC 244. The contaminant anions may be removed from the system in the ACC 242. The anions are not allowed to pass through a first CM 241 that defines the anode-side of the ACC 242 and into the anode chamber 240. One benefit of this configuration is that this prevents fouling and scaling of the anode chamber 240 since the anions cannot react with cations to form insoluble scaling materials (i.e., $CaCO_3$, $Mg(OH)_2$, etc.). The anions cannot travel toward the cathode because of the influence of the applied electric field. Therefore, the anions may be effectively removed in the ADC 244 or contained in the ACC 242 until they are flushed from the system by the waste liquid stream that removes ions from the ACC 242. The cations are attracted to the cathode under the influence of the applied electric field and may be allowed to pass through a second CM 247 and into the CDC 248. The contaminant cations may be removed from the system in the CCC 250. The cations are not allowed to pass through a third AM 251 that defines the cathode-side of the CCC 250 and into the cathode chamber 252. One benefit of this configuration is that this prevents fouling and scaling of the cathode chamber 252 since the cations cannot react with anions to form insoluble scaling materials (i.e., $CaCO_3$, $Mg(OH)_2$, etc.). The cations cannot travel toward the anode because of the influence of the applied electric field. Therefore, the cations may be effectively removed in the CDC 248 or contained in the CCC 250 until they are flushed from the system by the waste liquid stream that removes ions from the CCC 250.

Water splitting occurs in the CBDC 246 since it may include therein a mixed ion exchange material, or a doped anion exchange material, or a doped cation exchange material. The water splitting in the CBDC 246 serves to regenerate the second AM 245 that separates the CBDC 246 from the ADC 244 as well as the second CM 247 that separates the CBDC 246 from the adjacent CDC 248. Additionally, hydronium ions generated by the water splitting are attracted to the cathode and enter the adjacent CDC 248 where they may be effective in regenerating the cation exchange material contained therein. Additionally, hydroxide ions generated by the water splitting are attracted to the anode and enter the adjacent ADC 244 where they may be effective in regenerating the anion exchange material contained therein.

The apparatus and method of use illustrated in FIGS. 2A-D address the cathode fouling and ion exchange degradation problems common in conventional EDI apparatuses since the cathode and anode chambers may not receive the contaminant ions and water splitting in the composite or doped bed depletion chambers generates hydronium and hydroxide ions for the regeneration of the anion membranes, cation membranes, anion exchange materials, and the cation exchange materials.

By removing the CCBDC and the CM adjacent to the cathode from the apparatus of FIG. 2A and FIG. 2B, an apparatus, with the advantages of minimal electrode fouling or electrode degradation is illustrated schematically in FIG. 3A. An ACBDC 303 may be placed on the cathode-side of the anode chamber 301. The anode chamber 301 and the ACBDC 303 may be separated by a first AM 302. The ACBDC may include therein a mixed ion exchange material, or a doped anion exchange material, or a doped cation exchange material. A CDC 305 may be placed on the cathode-side of the ACBDC 303. The ACBDC 303 and the CDC 305 may be separated by a first CM 304. The CDC typically includes therein a homogeneous volume of cation exchange material. A CBCC 307 may be placed on the cathode-side of the CDC 305. The CDC 305 and the CBCC 307 may be separated by a second CM 306. The CBCC may include therein a mixed ion exchange material, or a doped anion exchange material, or a doped cation exchange material. An ADC 309 may be placed on the cathode-side of the CBCC 307. The CBCC 307 and the ADC 309 may be separated by a second AM 308. The ADC typically includes therein a homogeneous volume of anion exchange material. The ADC 309 may be separated from a cathode chamber 311 by a third AM 310. The cathode chamber includes a cathode therein.

In FIG. 3A, the majority of the contaminant ions may be drawn into the CBCC 307. The ACBDC 303 may serve as the final ion depletion chamber. As the product liquid passes through the ACBDC 303, residual contaminant anions may be removed into the anode chamber 301. Since the majority of contaminant anions may be removed by the ADC 309, the trace amounts of residual anions removed by the ACBDC 303 and into the anode chamber 301 will not cause significant electrode degradation. The apparatus as illustrated in FIG. 3A may be operated in continuous mode or in intermittent mode.

A method for performing electrodeionization utilizing the apparatus as illustrated in FIG. 3A comprises first causing the liquid to be deionized to flow through the CDC 305. The CDC may be capable of effectively removing contaminant cations from the liquid stream. The cations are attracted to the cathode under the influence of the applied electric field and may be allowed to pass through a second cation exchange membrane 306 and into the CBCC 307. The contaminant cations may be removed from the system in the CBCC 307. The cations are not allowed to pass through a second AM 308 that defines the cathode-side of the CBCC 307. The cations cannot travel toward the anode because of the influence of the applied electric field. Therefore the cations may be effectively contained in the CBCC 307 until they are flushed from the system by the waste liquid stream that removes ions from the CBCC 307. The liquid exiting the CDC 305 may be largely free of cationic contamination.

Following the passage through 305, the liquid is then flowed through the ADC 309. The ADC 309 may be capable of effectively removing contaminant anions from the liquid stream. The anions are attracted to the anode under the influence of the applied electric field and may be allowed to pass through a second anion exchange membrane 308 and into the CBCC 307. The contaminant anions may be removed from the system in the CBCC 307. The anions are not allowed to pass through a second CM 306 that defines the anode-side of the CBCC 307 and into the CDC 305. One benefit of this configuration is that this prevents degradation of the anode chamber 301 since anions cannot enter the anode chamber. The anions cannot travel toward the cathode because of the influence of the applied electric field. Therefore, the anions may be effectively removed in the ADC 309 or contained in the CBCC 307 until they are flushed from the system by the waste liquid stream that removes ions from the CBCC 307. The liquid exiting the ADC 309 may be largely free of anionic contamination.

Following the passage through 309, the liquid is then flowed through the ACBDC 303. The ACBDC 303 may be capable of removing both anions and cations. The remaining anions are attracted to the adjacent anode chamber 301 under the influence of the applied electric field and may be allowed to pass through a first AM 302 and may be removed from the liquid. The remaining cations are attracted toward the cathode under the influence of the applied electric field and may be allowed to pass through a first CM 304 into the adjacent CDC 305. The CDC 305 typically includes therein cation exchange materials and may be effective at removing the contaminant cations. The cations may be allowed to pass through a second cation exchange membrane 306 and into the CBCC 307. The contaminant cations may be removed from the system in the CBCC 307. The cations are not allowed to pass through a second AM 308 that defines the cathode-side of the CBCC 307. The cations cannot travel toward the anode because of the influence of the applied electric field. Therefore, the cations may be effectively contained in the CBCC 307 until they are flushed from the system by the waste liquid stream that removes ions from the CBCC 307. The liquid exiting the ACBDC 303 may have a reduced level of both anions and cations relative to the in-coming liquid stream.

Water splitting occurs in the ACBDC 303 since it may include therein a mixed ion exchange material, or a doped anion exchange material, or a doped cation exchange material. The water splitting in the ACBDC 303 may serve to regenerate the first AM 302 that Separates the ACBDC 303 from the anode chamber 301 as well as the first CM 304 that separates the ACBDC 303 from the adjacent CDC 305. Additionally, hydronium ions generated by the water splitting are attracted to the cathode and may enter the adjacent CDC 305 where they may be effective in regenerating the cation exchange material contained therein.

Another method (not shown) for performing electrodeionization utilizing the apparatus as illustrated in FIG. 3A comprises first causing the liquid to be deionized to flow through the ADC 309. The ADC 309 may be capable of effectively removing contaminant anions from the liquid stream. The anions are attracted to the anode under the influence of the applied electric field and may be allowed to pass through a second AM 308 and into the CBCC 307. The contaminant anions may be removed from the system in the CBCC 307. The anions are not allowed to pass through a second CM 306 that defines the anode-side of the CBCC 307 and into the CDC 305. The anions cannot travel toward the cathode because of the influence of the applied electric field. Therefore, the anions may be effectively removed in the ADC 309 or contained in the CBCC 307 until they are flushed from the system by the waste liquid stream that removes ions from the CBCC 307. The liquid exiting the ADC 309 may be largely free of anionic contamination.

Following the passage through 309, the liquid is then flowed through the CDC 305. The CDC 305 may be capable of effectively removing contaminant cations from the liquid stream. The cations are attracted to the cathode under the influence of the applied electric field and may be allowed to pass through a second CM 306 and into the CBCC 307. The contaminant cations may be removed from the system in the CBCC 307. The cations are not allowed to pass through a second AM 308 that defines the cathode-side of the CBCC 307. The cations cannot travel toward the anode because of the influence of the applied electric field. Therefore, the cations may be effectively contained in the CBCC 307 until they are flushed from the system by the waste liquid stream that removes ions from the CBCC 307. The liquid exiting the CDC 305 may be largely free of cationic contamination.

Following the passage through 305, the liquid is then flowed through the ACBDC 303. The ACBDC 303 may be capable of removing both anions and cations. The remaining anions are attracted to the adjacent anode chamber 301 under the influence of the applied electric field and may be allowed to pass through a first AM 302 and may be removed from the liquid. The remaining cations are attracted toward the cathode under the influence of the applied electric field and may be allowed to pass through a first CM 304 into the adjacent CDC 305. The CDC 305 typically includes therein cation exchange materials and may be effective at removing the contaminant cations. The cations may be allowed to pass through a second CM 306 and into the CBCC 307. The contaminant cations may be removed from the system in the CBCC 307. The cations are not allowed to pass through a second AM 308 that defines the cathode-side of the CBCC 307. The cations cannot travel toward the anode because of the influence of the applied electric field. Therefore, the cations may be effectively contained in the CBCC 307 until they are flushed from the system by the waste liquid stream that removes ions from the CBCC 307. The liquid exiting the ACBDC 303 may have a reduced level of both anions and cations relative to the in-coming liquid stream.

Water splitting occurs in the ACBDC 303 since it may include therein a mixed ion exchange material, or a doped anion exchange material, or a doped cation exchange material. The water splitting in the ACBDC 303 may serve to regenerate the AM 302 that separates the ACBDC 303 from the anode chamber 301 as well as the first CM 304 that separates the ACBDC 303 from the adjacent CDC 305. Additionally, hydronium ions generated by the water splitting are attracted to the cathode and may enter the adjacent CDC 305 where they may be effective in regenerating the cation exchange material contained therein.

FIG. 3B illustrates an EDI apparatus that may be equivalent to FIG. 3A with the polarity of the electric field reversed (i.e. the anode and cathodes are switched). That is, the path from anode to cathode in FIG. 3B traverses the same EDI components in the same order as the path from cathode to anode in FIG. 3A. The apparatus illustrated in FIG. 3B comprises an anode chamber 320. The anode chamber includes an anode therein. An ADC 322 may be placed on the cathode-side of the anode chamber 320. The anode chamber 320 and the ADC 322 may be separated by a first AM 321. The ADC typically includes therein a homogeneous volume of anion exchange material. A CBDC 324 may be placed on the cathode-side of the ADC 322. The ADC 322 and the CBDC 324 may be separated by a second AM 323. The CBDC may include therein a mixed ion exchange material, or a doped anion exchange material, or a doped cation exchange material. A CDC 326 may be placed on the cathode-side of the CBDC 324. The CBDC 324 and the CDC 326 may be separated by a first CM 325. The CDC typically includes therein a homogeneous volume of cation exchange material. A CCBCC 328 may be placed on the cathode-side of the CDC 326. The CDC 326 may be separated from the CCBCC 328 by a second CM 327. The CCBCC 328 may include therein a mixed ion exchange material, or a doped anion exchange material, or a doped cation exchange material. The CCBCC 328 may be separated from the cathode chamber 330 by a third AM 329. The cathode chamber includes a cathode therein.

A method for performing electrodeionization utilizing the apparatus as illustrated in FIG. 3B comprises first causing the liquid to be deionized to flow through the CDC 326. The CDC may be capable of effectively removing contaminant cations from the liquid stream. The cations are attracted to the cathode under the influence of the applied electric field and may be allowed to pass through a second cation exchange membrane 327 and into the CCBCC 328. The contaminant cations may be removed from the system in the CCBCC 328. The cations are not allowed to pass through a third AM 329 that defines the cathode-side of the CCBCC 328. The cations cannot travel toward the anode because of the influence of the applied electric field. Therefore, the cations may be effectively contained in the CCBCC 328 until they are flushed from the system by the waste liquid stream that removes ions from the CCBCC 328. The liquid exiting the CDC 326 may be largely free of cationic contamination.

Following the passage through 326, the liquid is then flowed through the ADC 322. The ADC 322 may be capable of effectively removing contaminant anions from the liquid stream. The anions are attracted to the anode under the influence of the applied electric field and may be allowed to pass through a first AM 321 and into the anode chamber 320. The contaminant anions may be removed from the system in the anode chamber 320. The cations are not allowed to pass through a second AM 323 that defines the cathode-side of the ADC 322 and into the CBDC 324. The anions cannot travel toward the cathode because of the influence of the applied electric field. Therefore, the anions may be effectively removed in the ADC 322. The liquid exiting the ADC 322 may be largely free of anionic contamination.

Following the passage through 322, the liquid is then flowed through the CBDC 324. The CBDC 324 may be capable of removing both anions and cations. The remaining anions are attracted to the adjacent ADC 322 under the influence of the applied electric field and may be allowed to pass through a second AM 323 and may be removed from the liquid. The remaining cations are attracted toward the cathode under the influence of the applied electric field and may be allowed to pass through a first CM 325 into the adjacent CDC 326. The CDC 326 typically includes therein cation exchange materials and may be effective at removing the contaminant cations. The cations may be allowed to pass through a second cation exchange membrane 327 and into the CCBCC 328. The contaminant cations may be removed from the system in the CCBCC 328. The cations are not allowed to pass through a third AM 329 that defines the cathode-side of the CCBCC 328. The cations cannot travel toward the anode because of the influence of the applied electric field. Therefore, the cations may be effectively contained in the CCBCC 328 until they are flushed from the system by the waste liquid stream that removes ions from the CCBCC 328. The liquid exiting the CBDC 324 may have a reduced level of both anions and cations relative to the in-coming liquid stream.

Water splitting occurs in the CBDC 324 since it may include therein a mixed ion exchange material, or a doped anion exchange material, or a doped cation exchange material. The water splitting in the CBDC 324 may serve to regenerate the second AM 323 that separates the ADC 322 from the CBDC 324 as well as the first CM 325 that separate the CBDC 324 from the adjacent CDC 326. Hydroxide ions generated by the water splitting are attracted to the anode and may enter the adjacent ADC 322 where they may be effective in regenerating the anion exchange material contained therein. Additionally, hydronium ions generated by the water splitting are attracted to the cathode and may enter the adjacent CDC 326 where they may be effective in regenerating the cation exchange material contained therein.

In FIG. 3B, cations may be drawn into the CCBCC 328 and are removed from the system by the waste liquid stream. The CBDC 324 may serve as the final ion depletion chamber. The apparatus as illustrated in FIG. 3B may be operated in continuous mode or in intermittent mode.

Another method (not shown) for performing electrodeionization utilizing the apparatus as illustrated in FIG. 3B comprises first causing the liquid to be deionized to flow through the ADC 322. The ADC 322 may be capable of effectively removing contaminant anions from the liquid stream. The anions are attracted to the anode under the influence of the applied electric field and may be allowed to pass through a first AM 321 and into the anode chamber 320. The contaminant anions may be removed from the system in the anode chamber 320. The anions cannot travel toward the cathode because of the influence of the applied electric field. Therefore, the anions may be effectively removed in the ADC 322 or contained in the anode chamber 320 until they are flushed from the system by the waste liquid stream that removes ions from the anode chamber 320. The liquid exiting the ADC 322 may be largely free of anionic contamination.

Following the passage through 322, the liquid is then flowed through the CDC 326. The CDC 326 may be capable of effectively removing contaminant cations from the liquid stream. The cations are attracted to the cathode under the influence of the applied electric field and may be allowed to pass through a second CM 327 and into the CCBCC 328. The contaminant cations may be removed from the system in the CCBCC 328. The cations are not allowed to pass through a third AM 329 that defines the cathode-side of the CCBCC 328. The cations cannot travel toward the anode because of the influence of the applied electric field. Therefore, the cations may be effectively contained in the CCBCC 328 until they are flushed from the system by the waste liquid stream that removes ions from the CCBCC 328. The liquid exiting the CDC 326 may be largely free of cationic contamination.

Following the passage through 326, the liquid is then flowed through the CBDC 324. The CBDC 324 may be capable of removing both anions and cations. The remaining anions are attracted to the adjacent ADC 322 under the influence of the applied electric field and may be allowed to pass through a second AM 321 and may be removed from the liquid. The remaining anions may then pass through AM 321 and into anode chamber 320. The remaining cations are attracted toward the cathode under the influence of the applied electric field and may be allowed to pass through a first CM 325 into the adjacent CDC 326. The CDC 326 typically includes therein cation exchange materials and may be effective at removing the contaminant cations. The cations may be allowed to pass through a second CM 327 and into the CCBCC 328. The contaminant cations may be removed from the system in the CCBCC 328. The cations are not allowed to pass through a third AM 329 that, defines the cathode-side of the CCBCC 328. The cations cannot travel toward the anode because of the influence of the applied electric field. Therefore, the cations may be effectively contained in the CCBCC 328 until they are flushed from the system by the waste liquid stream that removes ions from the CCBCC 328. The liquid exiting the CBDC 324 may have a reduced level of both anions and cations relative to the in-coming liquid stream.

Water splitting occurs in the CBDC 324 since it may include therein a mixed ion exchange material, or a doped anion exchange material, or a doped cation exchange material. The water splitting in the CBDC 324 may serve to regenerate the second AM 323 that separates the CBDC 324 from the ADC 322 and AM 321 as well as the first CM 325 that separates the CBDC 324 from the adjacent CDC 326 and CM 327. Hydroxide ions generated by the water splitting are attracted to the anode and may enter the adjacent ADC 322 where they may be effective in regenerating the anion exchange material contained therein. Additionally, hydronium ions generated by the water splitting are attracted to the cathode and may enter the adjacent CDC 326 where they may be effective in regenerating the cation exchange material contained therein.

The apparatus illustrated in FIG. 3C comprises an anode chamber 340. The anode chamber includes an anode therein. An ADC 342 may be placed on the cathode-side of the anode chamber 340. The anode chamber 340 and the ADC 342 may be separated by a first AM 341. The ADC typically includes therein a homogeneous volume of anion exchange material. A CBDC 344 may be placed on the cathode-side of the ADC 342. The ADC 342 and the CBDC 344 may be separated by a second AM 343. The CBDC may include therein a mixed ion exchange material, or a doped anion exchange material, or a doped cation exchange material. A CDC 346 may be placed on the cathode-side of the CBDC 344. The CBDC 344 and the CDC 346 may be separated by a first CM 345. The CDC typically includes therein a homogeneous volume of cation exchange material. A CCC 348 may be placed on the cathode-side of the CDC 346. The CDC 346 may be separated from the CCC 348 by a second CM 347. The CCC 348 may include therein a homogeneous volume of anion exchange material, or a homogeneous volume of cation exchange material, or a mixed ion exchange material, or a doped anion exchange material, or a doped cation exchange material. The CCC 348 may be separated from the cathode chamber 350 by a third AM 349. The cathode chamber includes a cathode therein.

A method for performing electrodeionization utilizing the apparatus as illustrated in FIG. 3C comprises first causing the liquid to be deionized to flow through the CDC 346. The CDC may be capable of effectively removing contaminant cations from the liquid stream. The cations are attracted to the cathode under the influence of the applied electric field and may be allowed to pass through a second cation exchange membrane 347 and into the CCC 348. The contaminant cations may be removed from the system in the CCC 348. The cations are not allowed to pass through a third AM 349 that defines the cathode-side of the CCC 348. The cations cannot travel toward the anode because of the influence of the applied electric field. Therefore, the cations may be effectively contained in the CCC 348 until they are flushed from the system by the waste liquid stream that removes ions from the CCC 348. The liquid exiting the CDC 346 may be largely free of cationic contamination.

Following the passage through 346, the liquid is then flowed through the ADC 342. The ADC 342 may be capable of effectively removing contaminant anions from the liquid stream. The anions are attracted to the anode under the influence of the applied electric field and may be allowed to pass through a first AM 341 and into the anode chamber 340. The contaminant anions may be removed from the system in the anode chamber 340. The cations are not allowed to pass through a second AM 343 that defines the cathode-side of the ADC 342 and into the CBDC 344. The anions cannot travel toward the cathode because of the influence of the applied electric field. Therefore, the anions may be effectively removed in the ADC 342. The liquid exiting the ADC 342 may be largely free of anionic contamination.

Following the passage through 342, the liquid is then flowed through the CBDC 344. The CBDC 344 may be capable of removing both anions and cations. The remaining anions are attracted to the adjacent ADC 342 under the influence of the applied electric field and may be allowed to pass through a second AM 343 into ADC 342 and may pass through AM 341 into anode chamber 340 and may be removed from the liquid. The remaining cations are attracted toward the cathode under the influence of the applied electric field and may be allowed to pass through a first CM 345 into the adjacent CDC 346. The CDC 346 typically includes therein cation exchange materials and may be effective at removing the contaminant cations. The cations may be allowed to pass through a second CM 347 and into the CCC 348. The contaminant cations may be removed from the system in the CCC 348. The cations are not allowed to pass through a third AM 349 that defines the cathode-side of the CCC 348. The cations cannot travel toward the anode because of the influence of the applied electric field. Therefore, the cations may be effectively contained in the CCC 348 until they are flushed from the system by the waste liquid stream that removes ions from the CCC 348. The liquid exiting the CBDC 344 may have a reduced level of both anions and cations relative to the in-coming liquid stream.

Water splitting occurs in the CBDC 344 since it may include therein a mixed ion exchange material, or a doped anion exchange material, or a doped cation exchange material. The water splitting in the CBDC 344 may serve to regenerate the second AM 343 that separates the first ADC 342 from the CBDC 344 as well as the first CM 345 that separates the CBDC 344 from the adjacent CDC 346. Hydroxide ions generated by the water splitting are attracted to the anode and may enter the adjacent ADC first 342 where they may be effective in regenerating the anion exchange material contained therein. Additionally, hydronium ions generated by the water splitting are attracted to the cathode and may enter the adjacent CDC 346 where they may be effective in regenerating the cation exchange material contained therein.

Another method (not shown) for performing electrodeionization utilizing the apparatus as illustrated in FIG. 3C comprises first causing the liquid to be deionized to flow through the ADC 342. The ADC 342 may be capable of effectively removing contaminant anions from the liquid stream. The anions are attracted to the anode under the influence of the applied electric field and may be allowed to pass through a fist AM 341 and into the anode chamber 340. The contaminant anions may be removed from the system in the anode chamber 340. The anions cannot travel toward the cathode because of the influence of the applied electric field. Therefore, the anions may be effectively removed in the ADC 342 or contained in the anode chamber 340 until they are flushed from the system by the waste liquid stream that removes ions from the anode chamber 340. The liquid exiting the ADC 342 may be largely free of anionic contamination.

Following the passage through 342, the liquid is then flowed through the CDC 346. The CDC 346 may be capable of effectively removing contaminant cations from the liquid stream. The cations are attracted to the cathode under the influence of the applied electric field and may be allowed to pass through a second CM 347 and into the CCC 348. The contaminant cations may be removed from the system in the CCC 348. The cations are not allowed to pass through a third AM 349 that defines the cathode-side of the CCC 348. The cations cannot travel toward the anode because of the influence of the applied electric field. Therefore, the cations may be effectively contained in the CCC 348 until they are flushed from the system by the waste liquid stream that removes ions from the CCC 348. The liquid exiting the CDC 346 may be largely free of cationic contamination.

Following the passage through 346, the liquid is then flowed through the CBDC 344. The CBDC 344 may be capable of removing both anions and cations. The remaining anions are attracted to the adjacent ADC 342 under the influence of the applied electric field and may be allowed to pass through a second AM 343 and may be removed from the liquid. The remaining cations are attracted toward the cathode under the influence of the applied electric field and may be allowed to pass through a first CM 345 into the adjacent CDC 346. The CDC 346 typically includes therein cation exchange materials and may be effective at removing the contaminant cations. The cations may be allowed to pass through a second CM 347 and into the CCC 348. The contaminant cations may be removed from the system in the CCC 348. The cations are not allowed to pass through a third AM 349 that defines the cathode-side of the CCC 348. The cations cannot travel toward the anode because of the influence of the applied electric field. Therefore, the cations may be effectively contained in the CCC 348 until they are flushed from the system by the waste liquid stream that removes ions from the CCC 348. The liquid exiting the CBDC 344 may have a reduced level of both anions and cations relative to the in-coming liquid stream.

Water splitting occurs in the CBDC 344 since it may include therein a mixed ion exchange material, or a doped anion exchange material, or a doped cation exchange material. The water splitting in the CBDC 344 may serve to regenerate the second AM 343 that separates the CBDC 344 from the ADC 342 as well as the first CM 345 that separates the CBDC 344 from the adjacent CDC 346. Hydroxide ions generated by the water splitting are attracted to the anode and may enter the adjacent ADC 342 where they may be effective in regenerating the anion exchange material contained therein. Additionally, hydronium ions generated by the water splitting are attracted to the cathode and may enter the adjacent CDC 346 where they may be effective in regenerating the cation exchange material contained therein.

The apparatus and methods of use illustrated in FIG. 3A-C address the electrode fouling and ion exchange degradation problems since the electrode chambers receive a reduced quantity of the contaminant ions and water splitting in the composite bed depletion chambers generates hydronium and hydroxide ions for the regeneration of the anion membranes, cation membranes, and the cation exchange materials. As was discussed for the apparatus illustrated in FIG. 2A and FIG. 2B, the CBCC 207 may be used to remove the cations and thus minimizes scaling in the cathode chamber.

Similar apparatuses to FIG. 3A-C are illustrated in FIGS. 4A-C. In the apparatus illustrated in FIG. 4A, the ACBDC and the AM adjacent to the anode from the apparatus of FIG. 2A and FIG. 2B have been removed.

The apparatus illustrated in FIG. 4A comprises an anode chamber 401. A CDC 403 may be placed on the cathode-side of the anode chamber 401. The anode chamber 401 and the CDC 403 may be separated by a first CM 402. The CDC 403 typically includes therein a homogeneous volume of cation exchange material. A CBCC 405 may be placed on the cathode-side of the CDC 403. The CDC 403 and the CBCC 405 may be separated by a second CM 404. The CBCC 405 may include therein a mixed ion exchange material, or a doped anion exchange material, or a doped cation exchange material. An ADC 407 may be placed on the cathode-side of the CBCC 405. The CBCC 405 and the ADC 407 may be separated by a first AM 406. The ADC 407 typically includes therein a homogeneous volume of anion exchange material. A CCBDC 409 may be placed on the cathode-side of the ADC 407. The ADC 407 and the CCBDC 409 may be separated by a second AM 408. The CCBDC 409 may include therein a mixed ion exchange material, or a doped anion exchange material, or a doped cation exchange material. The CCBDC 409 may be separated from a cathode chamber 411 by a third CM 410. The cathode chamber includes a cathode therein.

This results in an apparatus with the advantages of minimal electrode fouling or electrode degradation. The CCBDC 409 may act as the final ion depletion chamber for the product liquid. Most contaminant ions may be removed into the CBCC 405. Any cations present in the product liquid after the ADC 407 may be removed by the CCBDC 409 and exit into the cathode chamber. Since the quantity of cations being removed into the cathode chamber may be very small, scaling in the cathode chamber may be insignificant.

The apparatus illustrated in FIG. 4A is also advantageous when deionizing liquids with high concentrations of chloride ions. In conventional EDI apparatuses where the anions may be removed through the anode chamber, oxidation may occur wherein chloride may be oxidized to chlorine, chlorite, and hypochlorite among others. This may cause degradation of the EDI apparatus. The configuration as illustrated in FIG. 4A may remove the majority of the anions through the CBCC chamber, thus resolving the issues present in most conventional EDI apparatuses. The apparatus as illustrated in FIG. 4A may be operated in continuous mode or in intermittent mode.

A method for performing electrodeionization utilizing the apparatus as illustrated in FIG. 4A comprises first causing the liquid to be deionized to flow through the CDC 403. The CDC 403 may be capable of effectively removing contaminant cations from the liquid stream. The cations are attracted to the cathode under the influence of the applied electric field and may be allowed to pass through a second CM 404 and into the CBCC 405. The contaminant cations may be removed from the system in the CBCC 405. The cations are not allowed to pass through a first AM 406 that defines the cathode-side of the CBCC 405. The cations cannot travel toward the anode because of the influence of the applied electric field. Therefore, the cations may be effectively contained in the CBCC 405 until they are flushed from the system by the waste liquid stream that removes ions from the CBCC 405. The liquid exiting the CDC 403 may be largely free of cationic contamination.

Following the passage through 403, the liquid is then flowed through the ADC 407. The ADC 407 may be capable of effectively removing contaminant anions from the liquid stream. The anions are attracted to the anode under the influence of the applied electric field and may be allowed to pass through a first AM 406 and into the CBCC 405. The contaminant anions may be removed from the system in the CBCC 405. The anions are not allowed to pass through a second CM 404 that defines the anode-side of the CBCC 405 and into the CDC 403. The anions cannot travel toward the cathode because of the influence of the applied electric field. Therefore, the anions may be effectively removed in the ADC 407 or contained in the CBCC 405 until they are flushed from the system by the waste liquid stream that removes ions from the CBCC 405. The liquid exiting the ADC 407 may be largely free of anionic contamination.

Following the passage through 407, the liquid is then flowed through the CCBDC 409. The CCBDC 409 may be capable of removing both anions and cations. The remaining cations are attracted to the adjacent cathode chamber 411 under the influence of the applied electric field and may be allowed to pass through a third CM 410 and may be removed from the liquid. The remaining anions are attracted toward the anode under the influence of the applied electric field and may be allowed to pass through a second AM 408 into the adjacent ADC 407. The ADC 407 typically includes therein anion exchange materials and may be effective at retaining the contaminant anions. The anions may be allowed to pass through a first AM 406 and into the CBCC 405. The contaminant anions may be removed from the system in the CBCC 405. The anions are not allowed to pass through a second CM 404 that defines the anode side of the CBCC 405. The anions cannot travel toward the cathode because of the influence of the applied electric field. Therefore, the anions may be effectively removed in the ADC 407 or contained in the CBCC 405 until they are flushed from the system by the waste liquid stream that removes ions from the CBCC 405. The liquid exiting the CCBDC 409 may have a reduced level of both anions and cations relative to the in-coming liquid stream.

Water splitting occurs in the CCBDC 409 since it may include therein a mixed ion exchange material, or a doped anion exchange material, or a doped cation exchange material. The water splitting in the CCBDC 409 may serve to regenerate the third CM 410 that separates the CCBDC 409 from the cathode chamber 411 as well as the second AM 408 that separates the CCBDC 409 from the adjacent ADC 407. Additionally, hydroxide ions generated by the water splitting are attracted to the anode and enter the adjacent ADC 407 where they may be effective in regenerating the anion exchange material contained therein.

Another method (not shown) for performing electrodeionization utilizing the apparatus as illustrated in FIG. 4A comprises first causing the liquid to be deionized to flow through the ADC 407. The ADC 407 may be capable of effectively removing contaminant anions from the liquid stream. The anions are attracted to the anode under the influence of the applied electric field and may be allowed to pass through a first AM 406 and into the CBCC 405. The contaminant anions may be removed from the system in the CBCC 405. The anions are not allowed to pass through a second CM 404 that defines the anode-side of the CBCC 405 and into the CDC 403. The anions cannot travel toward the cathode because of the influence of the applied electric field. Therefore, the anions may be effectively removed in the ADC 407 or contained in the CBCC 405 until they are flushed from the system by the waste liquid stream that removes ions from the CBCC 405. The liquid exiting the ADC 407 may be largely free of anionic contamination.

Following the passage through 407, the liquid is then flowed through the CDC 403. The CDC 403 may be capable of effectively removing contaminant cations from the liquid stream. The cations are attracted to the cathode under the influence of the applied electric field and may be allowed to pass through a second CM 404 and into the CBCC 405. The contaminant cations may be removed from the system in the CBCC 405. The cations are not allowed to pass through a first AM 406 that defines the cathode-side of the CBCC 405. The cations cannot travel toward the anode because of the influence of the applied electric field. Therefore, the cations may be effectively contained in the CBCC 405 until they are flushed from the system by the waste liquid stream that removes ions from the CBCC 405. The liquid exiting the CDC 403 may be largely free of cationic contamination.

Following the passage through 403, the liquid is then flowed through the CCBDC 409. The CCBDC 409 may be capable of removing both anions and cations. The remaining cations are attracted to the adjacent cathode chamber 411 under the influence of the applied electric field and may be allowed to pass through a third CM 410 and may be removed from the liquid. The remaining anions are attracted toward the anode under the influence of the applied electric field and may be allowed to pass through a second AM 408 into the adjacent ADC 407. The ADC 407 typically includes therein anion exchange materials and may be effective at retaining the contaminant anions. The anions may be allowed to pass through a first AM 406 and into the CBCC 405. The contaminant anions may be removed from the system in the CBCC 405. The anions are not allowed to pass through a second CM 404 that defines the anode-side of the CBCC 405. The anions cannot travel toward the cathode because of the influence of the applied electric field. Therefore, the anions may be effectively removed in the ADC 407 or contained in the CBCC 405 until they are flushed from the system by the waste liquid stream that removes ions from the CBCC 405. The liquid exiting the CCBDC 409 may have a reduced level of both anions and cations relative to the in-coming liquid stream.

Water splitting occurs in the CCBDC 409 since it may include therein a mixed ion exchange material, or a doped anion exchange material, or a doped cation exchange material. The water splitting in the CCBDC 409 may serve to regenerate the third CM 410 that separates the CCBDC 409 from the cathode chamber as well as the second AM 408 that separates the CCBDC 409 from the adjacent ADC 407. Additionally, hydroxide ions generated by the water splitting are attracted to the anode and enter the adjacent ADC 407 where they may be effective in regenerating the anion exchange material contained therein.

EXAMPLE 3

An EDI device as shown in FIG. 4A was constructed using machined high density polyethylene hardware to retain the electrodes, membranes and resin. The internal flow dimensions of the ADC 407 were 1.27 cm in diameter and 3.81 cm in length. The internal flow dimensions of the CBCC 405 were 1.27 cm in diameter and 1.27 cm in length. The internal flow dimensions of the CDC 403 were 1.27 cm in diameter and 3.81 cm in length. The internal flow dimensions of the CCBDC 409 were 1.27 cm (diameter) and 1.27 cm (length). All cation materials were in the hydronium form and all anion materials were in the hydroxide form.

The anode chamber 401, for this example, contained platinum gauze electrodes (Unique Wire Weaving Inc, Hillside, N.J.). In contact with the anode and separating the anode chamber 401 from the ADC 403 was a cation exchange membrane 402 (CMI-7000, a product of Membranes International, Glen Rock, N.J.). The CDC 403 was filled with a cation exchange resin (DOWEX™ 50Wx4 (200 mesh), a product of The Dow Chemical Company, Midland, Mich.). Separating the CDC 403 from the CBCC 405 was a cation exchange membrane 404 (CMI-7000, a product of Membranes International, Glen Rock, N.J.). The CBCC 405 chamber contained a mixture of cation exchange resin (DOWEX™ 50Wx4 (200 mesh), a product of The Dow Chemical Company, Midland, Mich.) and anion exchange resin (DOWEX™ 1x4 (200 mesh), a product of The Dow Chemical Company, Midland, Mich.). The ion exchange capacity ratio of anion to cation was 1:1 (a mixed bed). The cation resin and anion resin were in the in the hydronium and hydroxide forms, respectively. The CBCC 405 was separated from the ADC 407 by an anion membrane 406 (AMI-7001, a product of Membranes International, Glen Rock, N.J.). The ADC 407 was filled with an anion exchange resin (DOWEX™ 1x4 (200 mesh), a product of The Dow Chemical Company, Midland, Mich.). The ADC 407 was separated from the CCBDC 409 by an anion exchange membrane 408 (AMI-7001, a product of Membranes International, Glen Rock, N.J.). The CCBDC 409 was filled contains a mixture of cation exchange resin (DOWEX™ 50Wx4 (200 mesh), a product of The Dow Chemical Company, Midland, Mich.) and anion exchange resin (DOWEX™ 1x4 (200 mesh), a product of The Dow Chemical Company, Midland, Mich.) in the hydronium and hydroxide forms, respectively. The ion exchange capacity ratio of anion to cation was 1:2 (a doped cation bed). Separating the CCBDC 409 from the cathode chamber 411 was a cation exchange membrane 410 (CMI-7000, a product of Membranes International, Glen Rock, N.J.). A pump (GP40, a product of Dionex, Sunnyvale, Calif.) was use to deliver RO quality water (specific conductance 10.7 µs/cm) at a flow rate of 2.0 mL/min to the EDI device shown in FIG. 4. A conductivity detector (CD20, a product of Dionex, Sunnyvale, Calif.) with a flow cell was used for the conductivity measurements. From the pump, the RO water flow was directed to the CDC 403, then to the ADC 407, next to the CCBDC 409 and then to the flow through conductivity cell. From the conductivity cell, the flow was directed to the anode chamber 401 and then the cathode chamber 411 and finally to waste.

Initially, the conductance of the water exiting the EDI device was 2.2 µS/cm. Using a laboratory power supply (E3612A, a product of Agilent, Santa Clara, Calif.) a constant current of 40 mA was applied and the initial voltage was 48V. Gas evolution was observed immediately from the anode and cathode chambers. The initial background conductivity of the product water increased to 48 µS/cm and over a 1 hour period the conductivity decreased to 0.67 µS/cm. The EDI device was allowed to operate continuously for 9 days. The data in Table 3 shows results for the device of FIG. 4.

TABLE 3

Conductance Measurements vs. Time

| Hours | Voltage | Conductivity (µS/cm) |
|---|---|---|
| 0.0 | 0.0 | 2.2 |
| 1 | 41 | 0.67 |
| 2 | 37 | 0.23 |
| 10 | 32 | 0.079 |
| 24 | 20 | 0.062 |
| 48 | 22 | 0.071 |
| 72 | 24 | 0.059 |
| 96 | 24 | 0.055 |
| 120 | 26 | 0.055 |
| 144 | 27 | 0.056 |
| 168 | 26 | 0.055 |
| 192 | 27 | 0.055 |
| 216 | 28 | 0.057 |

FIG. 4B illustrates an EDI apparatus that may be equivalent to FIG. 4A with the polarity of the electric field reversed (i.e. the anode and cathodes are switched). That is, the path from anode to cathode in FIG. 4B traverses the same EDI components in the same order as the path from cathode to anode in FIG. 4A. The apparatus illustrated in FIG. 4B comprises an anode chamber 420. The anode chamber includes an anode therein. An ACBCC 422 may be placed on the cathode-side of the anode chamber 420. The anode chamber 420 and the ACBCC 422 may be separated by a first CM 421. The ACBCC 422 may include therein a mixed ion exchange material, or a doped anion exchange material, or a doped cation exchange material. An ADC 424 may be placed on the cathode-side of the ACBCC 422. The ACBCC 422 and the ADC 424 may be separated by a first AM 423. The ADC 424 typically includes therein a homogeneous volume of anion exchange material. A CBDC 426 may be placed on the cathode-side of the ADC 424. The ADC 424 and the CBDC 426 may be separated by a second AM 425. The CBDC 426 may include therein a mixed ion exchange material, or a doped anion exchange material, or a doped cation exchange material. A CDC 428 may be placed on the cathode-side of the CBDC 426. The CBDC 426 and the CDC 428 may be separated by a second CM 427. The CDC 428 typically includes therein a homogeneous volume of cation exchange material. The CDC 428 may be separated from a cathode chamber 430 by a third CM 429. The cathode chamber includes a cathode therein.

This results in an apparatus with the advantages of minimal anode fouling or anode degradation. The CBDC 426 may act as the final ion depletion chamber for the product liquid. Most contaminant anions may be removed into the ACBCC 422.

Any cations present in the product liquid after the CDC 428 may be removed by the CBDC 426.

A method for performing electrodeionization utilizing the apparatus as illustrated in FIG. 4B comprises first causing the liquid to be deionized to flow through the CDC 428. The CDC 428 may be capable of effectively removing contaminant cations from the liquid stream. The cations are attracted to the cathode under the influence of the applied electric field and may be allowed to pass through a third CM 429 and into the cathode chamber 430. The contaminant cations may be removed from the system in the cathode chamber 430. The cations cannot travel toward the anode because of the influence of the applied electric field. Therefore, the cations may be effectively contained in the cathode chamber 430 until they are flushed from the system by the waste liquid stream that removes ions from the cathode chamber 430. The liquid exiting the CDC 428 may be largely free of cationic contamination.

Following the passage through 428, the liquid is then flowed through the ADC 424. The ADC 424 may be capable of effectively removing contaminant anions from the liquid stream. The anions are attracted to the anode under the influence of the applied electric field and may be allowed to pass through a first AM 423 and into the ACBCC 422. The contaminant anions may be removed from the system in the ACBCC 422. The anions are not allowed to pass through a first CM 421 that defines the anode-side of the ACBCC 422 and into the anode chamber 420. The anions cannot travel toward the cathode because of the influence of the applied electric field. Therefore, the anions may be effectively removed in the ADC 424 or contained in the ACBCC 422 until they are flushed from the system by the waste liquid stream that removes ions from the ACBCC 422. The liquid exiting the ADC 424 may be largely free of anionic contamination.

Following the passage through 424, the liquid is then flowed through the CBDC 426. The CBDC 426 may be capable of removing both anions and cations. The remaining cations are attracted to the cathode chamber 430 under the influence of the applied electric field and may be allowed to pass through a second CM 427 and into the CDC 428. The remaining anions are attracted toward the anode under the influence of the applied electric field and may be allowed to pass through a second AM 425 into the adjacent ADC 424. The ADC 424 typically includes therein anion exchange materials and may be effective at retaining the contaminant anions. The anions may be allowed to pass through a first AM 423 and into the ACBCC 422. The contaminant anions may be removed from the system in the ACBCC 422. The anions are not allowed to pass through a first CM 421 that defines the anode-side of the ACBCC 422. The anions cannot travel toward the cathode because of the influence of the applied electric field. Therefore, the anions may be effectively removed in the ADC 424 or contained in the ACBCC 422 until they are flushed from the system by the waste liquid stream that removes ions from the ACBCC 422. The liquid exiting the CBDC 426 may have a reduced level of both anions and cations relative to the in-coming liquid stream.

Water splitting occurs in the CBDC 426 since it may include therein a mixed ion exchange material, or a doped anion exchange material, or a doped cation exchange material. The water splitting in the CBDC 426 may serve to regenerate the second CM 427 that separates the CBDC 426 from the CDC 428 as well as the second AM 425 that separates the CBDC 426 from the adjacent ADC 424. Hydroxide ions generated by the water splitting are attracted to the anode and enter the adjacent ADC 424 where they may be effective in regenerating the anion exchange material contained therein. Additionally, hydronium ions generated by the water splitting are attracted to the cathode and may enter the adjacent CDC 428 where they may be effective in regenerating the cation exchange material contained therein.

Another method (not shown) for performing electrodeionization utilizing the apparatus as illustrated in FIG. 4B comprises first causing the liquid to be deionized to flow through the ADC 424. The ADC 424 may be capable of effectively removing contaminant anions from the liquid stream. The anions are attracted to the anode under the influence of the applied electric field and may be allowed to pass through a first AM 423 and into the ACBCC 422. The contaminant anions may be removed from the system in the ACBCC 422. The anions are not allowed to pass through a first CM 421 that defines the anode-side of the ACBCC 422 and into the anode chamber 420. The anions cannot travel toward the cathode because of the influence of the applied electric field. Therefore, the anions may be effectively removed in the ADC 424 or contained in the ACBCC 422 until they are flushed from the system by the waste liquid stream that removes ions from the ACBCC 422. The liquid exiting the ADC 424 may be largely free of anionic contamination.

Following the passage through 424, the liquid is then flowed through the CDC 428. The CDC 428 may be capable of effectively removing contaminant cations from the liquid stream. The cations are attracted to the cathode under the influence of the applied electric field and may be allowed to pass through a third CM 429 and into the cathode chamber 430. The contaminant cations may be removed from the system in the cathode chamber 430. The cations cannot travel toward the anode because of the influence of the applied electric field. Therefore, the cations may be effectively contained in the cathode chamber 430 until they are flushed from the system by the waste liquid stream that removes ions from the cathode chamber 430. The liquid exiting the CDC 428 may be largely free of cationic contamination.

Following the passage through 428, the liquid is then flowed through the CBDC 426. The CBDC 426 may be capable of removing both anions and cations. The remaining cations are attracted to the cathode under the influence of the applied electric field and may be allowed to pass through a second CM 427 and into the adjacent CDC 428. The remaining anions are attracted toward the anode under the influence of the applied electric field and may be allowed to pass through a second AM 425 into the adjacent ADC 424. The ADC 424 typically includes therein anion exchange materials and may be effective at retaining the contaminant anions. The anions may be allowed to pass through a first AM 423 and into the ACBCC 422. The contaminant anions may be removed from the system in the ACBCC 422. The anions are not allowed to pass through a first CM 421 that defines the anode-side of the ACBCC 422. The anions cannot travel toward the cathode because of the influence of the applied electric field. Therefore, the anions may be effectively removed in the ADC 424 or contained in the ACBCC 422 until they are flushed from the system by the waste liquid stream that removes ions from the ACBCC 422. The liquid exiting the CBDC 426 may have a reduced level of both anions and cations relative to the in-coming liquid stream.

Water splitting occurs in the CBDC 426 since it may include therein a mixed ion exchange material, or a doped anion exchange material, or a doped cation exchange material. The water splitting in the CBDC 426 may serve to regenerate the second CM 427 that separates the CBDC 426 from the CDC 428 as well as the second AM 425 that separates the CBDC 426 from the adjacent ADC 424. Additionally, hydroxide ions generated by the water splitting are attracted to the anode and enter the adjacent ADC 424 where they may be effective in regenerating the anion exchange material contained therein. Additionally, hydronium ions generated by the water splitting are attracted to the cathode and may enter the adjacent CDC 428 where they may be effective in regenerating the cation exchange material contained therein.

The apparatus illustrated in FIG. 4C comprises an anode chamber 440. The anode chamber includes an anode therein. An ACC 442 may be placed on the cathode-side of the anode chamber 440. The anode chamber 440 and the ACC 442 may be separated by a first CM 441. The ACC 442 may include therein a homogeneous volume of anion exchange material, or a homogeneous volume of cation exchange material, or a mixed ion exchange material, or a doped anion exchange material, or a doped cation exchange material. An ADC 444 may be placed on the cathode-side of the ACC 442. The ACC 442 and the ADC 444 may be separated by a first AM 443. The ADC 444 typically includes therein a homogeneous volume of anion exchange material. A CBDC 446 may be placed on the cathode-side of the ADC 444. The ADC 444 and the CBDC 446 may be separated by a second AM 445. The CBDC 446 may include therein a mixed ion exchange material, or a doped anion exchange material, or a doped cation exchange material. A CDC 448 may be placed on the cathode-side of the CBDC 446. The CBDC 446 and the CDC 448 may be separated by a second CM 447. The CDC 448 typically includes therein a homogeneous volume of cation exchange material. The CDC 448 may be separated from a cathode chamber 450 by a third CM 449. The cathode chamber includes a cathode therein.

This results in an apparatus with the advantages of minimal anode fouling or anode degradation. The CBDC 446 may act as the final ion depletion chamber for the product liquid. Most contaminant anions may be removed into the ACC 442. Any cations present in the product liquid after the CDC 448 may be removed by the CBDC 446.

A method for performing electrodeionization utilizing the apparatus as illustrated in FIG. 4C comprises first causing the liquid to be deionized to flow through the CDC 448. The CDC 448 may be capable of effectively removing contaminant cations from the liquid stream. The cations are attracted to the cathode under the influence of the applied electric field and may be allowed to pass through a third CM 449 and into the cathode chamber 450. The contaminant cations may be removed from the system in the cathode chamber 450. The cations cannot travel toward the anode because of the influence of the applied electric field. Therefore, the cations may be effectively contained in the cathode chamber 450 until they are flushed from the system by the waste liquid stream that removes ions from the cathode chamber 450. The liquid exiting the CDC 448 may be largely free of cationic contamination.

Following the passage through 448, the liquid is then flowed through the ADC 444. The ADC 444 may be capable of effectively removing contaminant anions from the liquid stream. The anions are attracted to the anode under the influence of the applied electric field and may be allowed to pass through a first AM 443 and into the ACC 442. The contaminant anions may be removed from the system in the ACC 442. The anions are not allowed to pass through a first CM 441 that defines the anode-side of the ACC 442 and into the anode chamber 440. The anions cannot travel toward the cathode because of the influence of the applied electric field. Therefore, the anions may be effectively removed in the ADC 444 or contained in the ACC 442 until they are flushed from the system by the waste liquid stream that removes ions from the ACC 442. The liquid exiting the ADC 444 may be largely free of anionic contamination.

Following the passage through 444, the liquid is then flowed through the CBDC 446. The CBDC 446 may be capable of removing both anions and cations. The remaining cations are attracted to the cathode under the influence of the applied electric field and may be allowed to pass through a second CM 447 and into the CDC 448. The remaining anions are attracted toward the anode under the influence of the applied electric field and may be allowed to pass through a second AM 445 into the adjacent ADC 444. The ADC 444 typically includes therein anion exchange materials and may be effective at retaining the contaminant anions. The anions may be allowed to pass through a first AM 443 and into the ACC 442. The contaminant anions may be removed from the system in the ACC 442. The anions are not allowed to pass through a first CM 441 that defines the anode-side of the ACC 442. The anions cannot travel toward the cathode because of the influence of the applied electric field. Therefore, the anions may be effectively removed in the ADC 444 or contained in the ACC 442 until they are flushed from the system by the waste liquid stream that removes ions from the ACC 442. The liquid exiting the CBDC 446 may have a reduced level of both anions and cations relative to the in-coming liquid stream.

Water splitting occurs in the CBDC 446 since it may include therein a mixed ion exchange material, or a doped anion exchange material, or a doped cation exchange material. The water splitting in the CBDC 446 may serve to regenerate the second CM 447 that separates the CBDC 446 from the CDC 448 as well as the second AM 445 that separates the CBDC 446 from the adjacent ADC 444. Hydroxide ions generated by the water splitting are attracted to the anode and enter the adjacent ADC 444 where they may be effective in regenerating the anion exchange material contained therein. Additionally, hydronium ions generated by the water splitting are attracted to the cathode and may enter the adjacent CDC 448 where they may be effective in regenerating the cation exchange material contained therein.

Another method (not shown) for performing electrodeionization utilizing the apparatus as illustrated in FIG. 4C comprises first causing the liquid to be deionized to flow through the ADC 444. The ADC 444 may be capable of effectively removing contaminant anions from the liquid stream. The anions are attracted to the anode under the influence of the applied electric field and may be allowed to pass through a first AM 443 and into the ACC 442. The contaminant anions may be removed from the system in the ACC 442. The anions are not allowed to pass through a first CM 441 that defines the anode-side of the ACC 442 and into the anode chamber 440. The anions cannot travel toward the cathode because of the influence of the applied electric field. Therefore, the anions may be effectively removed in the ADC 444 or contained in the ACC 442 until they are flushed from the system by the waste liquid stream that removes ions from the ACC 442. The liquid exiting the ADC 444 may be largely free of anionic contamination.

Following the passage through 444, the liquid is then flowed through the CDC 448. The CDC 448 may be capable of effectively removing contaminant cations from the liquid stream. The cations are attracted to the cathode under the influence of the applied electric field and may be allowed to pass through a third CM 449 and into the cathode chamber 450. The contaminant cations may be removed from the system in the cathode chamber 450. The cations cannot travel toward the anode because of the influence of the applied electric field. Therefore, the cations may be effectively contained in the cathode chamber 450 until they are flushed from the system by the waste liquid stream that removes ions from the cathode chamber 450. The liquid exiting the CDC 448 may be largely free of cationic contamination.

Following the passage through 448, the liquid is then flowed through the CBDC 446. The CBDC 446 may be capable of removing both anions and cations. The remaining cations are attracted to the cathode under the influence of the applied electric field and may be allowed to pass through a second CM 447 and into the adjacent CDC 448. The remaining anions are attracted toward the anode under the influence of the applied electric field and may be allowed to pass through a second AM 445 into the adjacent ADC 444. The ADC 444 typically includes therein anion exchange materials and may be effective at retaining the contaminant anions. The anions may be allowed to pass through a first AM 443 and into the ACC 442. The contaminant anions may be removed from the system in the ACC 442. The anions are not allowed to pass through a first CM 441 that defines the anode-side of the ACC 442. The anions cannot travel toward the cathode because of the influence of the applied electric field. Therefore, the anions may be effectively removed in the ADC 444 or contained in the ACC 442 until they are flushed from the system by the waste liquid stream that removes ions from the ACC 442. The liquid exiting the CBDC 446 may have a reduced level of both anions and cations relative to the in-coming liquid stream.

Water splitting occurs in the CBDC 446 since it may include therein a mixed ion exchange material, or a doped anion exchange material, or a doped cation exchange material. The water splitting in the CBDC 446 may serve to regenerate the second CM 447 that separates the CBDC 446 from the CDC 448 as well as the second AM 445 that separates the CBDC 446 from the adjacent ADC 444. Additionally, hydroxide ions generated by the water splitting are attracted to the anode and enter the adjacent ADC 444 where they may be effective in regenerating the anion exchange material contained therein. Additionally, hydronium ions generated by the water splitting are attracted to the cathode and may enter the adjacent CDC 448 where they may be effective in regenerating the cation exchange material contained therein.

The apparatus and methods of use illustrated in FIGS. 4A-C address the electrode fouling and ion exchange degradation problems since the electrode chambers may receive a reduced quantity of the contaminant ions and water splitting in the composite bed depletion chambers generates hydronium and hydroxide ions for the regeneration of the anion membranes, cation membranes, anion exchange materials, and the cation exchange materials.

In summary, the EDI apparatuses shown in FIGS. 2, 3, and 4 offer the advantages of homogeneous ion depletion chambers for enhanced ion removal, at least one composite bed depletion chamber for the final removal ("polishing") of trace ionic contaminants, at least one concentrate chamber for removal of ions, reduced electrode fouling or chemical degradation of ion exchange materials in the vicinity of the electrodes, and a simple design requiring only a single pair of electrodes.

In some applications, it may be desirable to remove a selective group of ions such as anion or cations, but the complete removal of both types of ions is not required. In this case, a simplified apparatus may be employed. The following discussion describes dual depletion chamber electrodeionization apparatuses which may be particularly configured for selective ion removal and may be interfaced directly to chemical analyzers or other analytical instrumentation.

Previously, multi depletion chamber apparatuses for the production of ultra pure liquid were discussed. These apparatuses comprised three or more discreet ion depletion chambers. In these configurations, these apparatuses combined the advantages of homogeneous ion exchange beds for enhanced ion removal, composite ion exchange bed(s) for the final removal of trace ionic contaminants, concentrate chamber(s) for removal of ions, and a simple design requiring only a single pair of electrodes. The apparatuses in the previous discussion contained at least one cation, at least one anion, at least one composite depletion, and at least one concentrate chambers.

Another embodiment of the present invention is illustrated in FIG. 5. The apparatus illustrated in FIG. 5 comprises an anode chamber 501 including an anode therein. An ADC 503 may be placed on the cathode-side of the anode chamber 501. The anode chamber 501 and the ADC 503 may be separated by a first AM 502. The ADC 503 typically includes therein a homogeneous volume of anion exchange material. A CCBDC 505 may be placed on the cathode-side of the ADC 503. The CCBDC 505 and the ADC 503 may be separated by a second AM 504. The CCBDC 505 may include therein a mixed ion exchange material, or a doped anion exchange material, or a doped cation exchange material. The CCBDC 505 may be separated from a cathode chamber 507 by a CM 506. The cathode chamber 507 typically includes a cathode therein. The apparatus as illustrated in FIG. 5 may be operated in continuous mode or in intermittent mode.

A method for performing electrodeionization utilizing the apparatus is illustrated in FIG. 5. The liquid may be initially directed through the ADC 503. The ADC 503 typically includes therein an inlet and an outlet port. The inlet and outlet ports may be configured so that the liquid may travel through substantially all of the length of the ADC 503. The inlet port is positioned closest to the first AM 502 to minimize the distance the anions must travel under the force of the electric field into the anode chamber 501. This typically maximizes the interaction between the liquid and the anion exchange material. The ADC 503 may remove most of the anions from the liquid. The anions will be attracted toward the anode by the applied electric field. The anions may be allowed to pass through the first AM 502 and into the anode chamber 501 where they may be removed by the waste stream used to flush the anode chamber 501. Cations will be retained within the liquid. Although the cations will be attracted toward the cathode by the applied electric field, they will not be allowed to pass through the second AM 504 of the cathode-side of the ADC 503.

Following the passage through 503, the liquid then passes through the CCBDC 505 where both anions and cations may be removed from the liquid. The cations will be attracted toward the cathode by the applied electric field. The cations may pass through the CM 506 and into the cathode chamber 507 where they may be removed from the system. The anions will be attracted toward the anode by the applied electric field. The anions may pass through the second AM 504, through the ADC 503, through the first AM 502 and into the anode chamber 501 where they may be removed from the system. The apparatus of FIG. 5 may produce liquid with significantly reduced levels of anions and reduced levels of cations.

The CM 506, ADC 503, first AM 502, and second AM 504 illustrated in FIG. 5 may be regenerated by water splitting that occurs within the CCBDC 505. Hydroxide ions will be attracted toward the anode by the applied electric field and may regenerate the ADC 503, first AM 502, and second AM 504 as they travel toward the anode. The CM 506 may be regenerated by water splitting that occurs within the CCBDC 505. Hydronium ions will be attracted toward the cathode by the applied electric field and may regenerate the CM 506 as they travel toward the cathode.

The apparatus as illustrated in FIG. 5 is thus capable of being used in a manner that renders it suitable for deionization, especially anion removal, for low ionic strength liquids. Examples of low ionic strength liquids include water that has received reverse osmosis, distillation, or prior deionization treatment. The apparatus as illustrated in FIG. 5 is thus capable of producing a liquid with very low concentrations of anions and thus may be suitable for purifying liquids for use in analytical techniques such as ion chromatography, inductively coupled plasma mass spectrometry, and atomic absorption spectroscopy, among others.

Another embodiment of the present invention is illustrated in FIG. 6. The apparatus illustrated in FIG. 6 comprises an anode chamber 601 including an anode therein. An ACBDC 603 may be placed on the cathode-side of the anode chamber 601. The anode chamber 601 and the ACBDC 603 may be separated by an AM 602. The ACBDC 603 may include therein a mixed ion exchange material, or a doped anion exchange material, or a doped cation exchange material. A CDC 605 may be placed on the cathode-side of the ACBDC 603. The CDC 605 and the ACBDC 603 may be separated by a first CM 604. The CDC 605 typically includes therein a homogeneous volume of cation exchange material. The CDC 605 may be separated from a cathode chamber 607 by a second CM 606. The cathode chamber 607 typically includes a cathode therein. The apparatus as illustrated in FIG. 6 may be operated in continuous mode or in intermittent mode.

A method for performing electrodeionization utilizing the apparatus is illustrated in FIG. 6. The liquid may be initially directed through the CDC 605. The CDC 605 typically includes therein an inlet and an outlet port. The inlet and outlet ports are configured so that the liquid may travel through substantially all of the length of the CDC 605. The inlet port is positioned closest to the second CM 606 to minimize the distance the cations must travel under the force of the electric field into the cathode chamber 607. This typically maximizes the interaction between the liquid and the cation exchange material. The CDC 605 may remove most of the cations from the liquid. The cations will be attracted toward the cathode by the applied electric field. The cations may be allowed to pass through the second CM 606 and into the cathode chamber 607 where they may be removed by the waste stream used to flush the cathode chamber 607. Anions will be retained within the liquid. Although the anions will be attracted toward the anode by the applied electric field, they will not be allowed to pass through the first CM 604 on the anode-side of the CDC 605.

Following the passage through 605, the liquid then passes through the ACBDC 603 where both anions and cations may be removed from the liquid. The cations will be attracted toward the cathode by the applied electric field. The cations may pass through the first CM 604, through the CDC 605, through the second CM 606 and into the cathode chamber 607 where they may be removed from the system. The anions will be attracted toward the anode by the applied electric field. The anions may pass through the AM 602 and into the anode chamber 601 where they may be removed from the system. The apparatus of FIG. 6 may produce liquid with significantly reduced levels of cations and reduced levels of anions.

The AM 602, CDC 605, first CM 604, and second CM 606 illustrated in FIG. 6 may be regenerated by water splitting that occurs within the ACBDC 603. Hydronium ions will be attracted toward the cathode by the applied electric field and may regenerate the first CM 604, CDC 605, and second CM 606 as they travel toward the cathode. The AM 602 may be regenerated by water splitting that occurs within the ACBDC 603. Hydroxide ions will be attracted toward the anode by the applied electric field and may regenerate the AM 602 as they travel toward the anode.

The apparatus as illustrated in FIG. 6 is thus capable of being used in a manner that renders it suitable for deionization, especially cation removal, for low ionic strength liquids. Examples of low ionic strength liquids include water that has received reverse osmosis, distillation, or prior deionization treatment. The apparatus as illustrated in FIG. 6 is thus capable of producing a liquid with very low concentrations of cations and thus may be suitable for purifying liquids for use in analytical techniques such as ion chromatography, inductively coupled plasma mass spectrometry, and atomic absorption spectroscopy, among others.

FIG. 7 illustrates an EDI apparatus comprising two ion depletion chambers, a concentrate chamber, an anode chamber, and a cathode chamber. The two electrode chambers and the concentrate chamber have a flow of waste stream liquid used to flush the contaminant ions from the chambers. The apparatus illustrated in FIG. 7 comprises an anode chamber 701 including an anode therein. A CDC 703 may be placed on the cathode-side of the anode chamber 701. The anode chamber 701 and the CDC 703 may be separated by a first CM 702. The CDC 703 typically includes therein a homogeneous volume of cation exchange material. A CBCC 705 may be placed on the cathode-side of the CDC 703. The CDC 703 and the CBCC 705 may be separated by a second CM 704. The CBCC 705 may include therein a mixed ion exchange material, or a doped anion exchange material, or a doped cation exchange material. A CCBDC 707 may be placed on the cathode-side of the CBCC 705. The CBCC 705 and the CCBDC 707 may be separated by an AM 706. The CCBDC 707 may include therein a mixed ion exchange material, or a doped anion exchange material, or a doped cation exchange material. The CCBDC 707 may be separated from a cathode chamber 709 by a third CM 708. The cathode chamber 709 typically includes a cathode therein. The apparatus as illustrated in FIG. 7 may be operated in continuous mode or in intermittent mode.

This results in an apparatus with the advantages of minimal electrode fouling or electrode degradation. The CCBDC 707 may act as the final ion depletion chamber for the product liquid. Most contaminant ions may be removed into the CBCC 705. Any cations present in the product liquid after the CDC may be removed by the CCBDC 707 and exit into the cathode chamber. Since the quantity of cations being removed into the cathode chamber may be very small, scaling in the cathode chamber may be insignificant.

The apparatus illustrated in FIG. 7 is also advantageous when deionizing liquids with high concentrations of chloride ions. In conventional EDI apparatuses where the anions may be removed through the anode chamber, oxidation may occur wherein chloride may be oxidized to chlorine, chlorite, and hypochlorite among others. This may cause degradation of the EDI apparatus. The configuration as illustrated in FIG. 7 may remove the majority of the anions through the CBCC chamber, thus resolving the issues present in most conventional EDI apparatuses.

A method for performing electrodeionization utilizing the apparatus as illustrated in FIG. 7 comprises first causing the liquid to be deionized to flow through the CDC 703. The interaction between the liquid and the CDC 703 may be maximized by placing the inlet to the CDC 703 near the second CM 704 and the outlet of the CDC 703 near the first CM 702. Alternatively, the inlet port may be positioned closest to the second CM 704 to minimize the distance the cations must travel under the force of the electric field into the CBCC. This causes the liquid to traverse the length of the CDC 703 as it flows from the inlet to the outlet. The CDC 703 may be capable of effectively removing contaminant cations from the liquid stream. The cations are attracted to the cathode under the influence of the applied electric field and may be allowed to pass through a second CM 704 and into the CBCC 705. The contaminant cations may be removed from the system in the CBCC 705. The cations are not allowed to pass through an AM 706 that defines the cathode-side of the CBCC 705. The cations cannot travel toward the anode because of the influence of the applied electric field. Therefore, the cations may be effectively contained in the CBCC 705 until they are flushed from the system by the waste liquid stream that removes ions from the CBCC 705. The liquid exiting the CDC 703 may be largely free of cationic contamination.

Following the passage through 703, the liquid is then flowed through the CCBDC 707. The interaction between the liquid and the CCBDC 707 may be maximized by placing the inlet to the CCBDC 707 near the AM 706 and the outlet of the CCBDC 707 near the third CM 708. This causes the liquid to traverse the length of the CCBDC 707 as it flows from the inlet to the outlet. The inlet port is positioned closest to the AM 706 to minimize the distance the anions must travel under the force of the electric field into the CBCC chamber 705. The CCBDC 707 may be capable of removing both anions and cations. The remaining cations are attracted to the adjacent cathode chamber 709 under the influence of the applied electric field and may be allowed to pass through a third CM 708 and may be removed from the liquid. The anions are attracted toward the anode under the influence of the applied electric field and may be allowed to pass through an AM 706 into the adjacent CBCC 705. The contaminant anions may be removed from the system in the CBCC 705. The anions are not allowed to pass through a second CM 704 that defines the anode-side of the CBCC 705. The anions cannot travel toward the cathode because of the influence of the applied electric field. Therefore, the anions may be effectively removed in the CBCC 705 until they are flushed from the system by the waste liquid stream that removes ions from the CBCC 705. The liquid exiting the CCBDC 707 may have a reduced level of both anions and cations relative to the in-coming liquid stream.

Water splitting occurs in the CCBDC 707 since it may include therein a mixed ion exchange material, or a doped anion exchange material, or a doped cation exchange material. The water splitting in the CCBDC 707 may serve to regenerate the third CM 708 that separates the CCBDC 707 from the cathode chamber 709 as well as the AM 706 that separates the CCBDC 707 from the adjacent CBCC 705.

The apparatus and method of use illustrated in FIG. 7 address the electrode fouling and ion exchange degradation problems since the electrode chambers may receive a reduced quantity of the contaminant ions and water splitting in the composite bed depletion chambers generates hydronium and hydroxide ions for the regeneration of the anion membranes, and cation membranes.

FIG. 8 illustrates an EDI apparatus comprising two ion depletion chambers, a concentrate chamber, an anode chamber, and a cathode chamber. The two electrode chambers and the concentrate chamber have a flow of waste stream liquid used to flush the contaminant ions from the chambers. The apparatus illustrated in FIG. 8 comprises an anode chamber 801 including an anode therein. An ACBDC 803 may be placed on the cathode-side of the anode chamber 801. The anode chamber 801 and the ACBDC 803 may be separated by a first AM 802. The ACBDC 803 may include therein a mixed ion exchange material, or a doped anion exchange material, or a doped cation exchange material. A CBCC 805 may be placed on the cathode-side of the ACBDC 803. The ACBDC 803 and the CBCC 805 may be separated by a CM 804. The CBCC 805 may include therein a mixed ion exchange material, or a doped anion exchange material, or a doped cation exchange material. An ADC 807 may be placed on the cathode-side of the CBCC 805. The CBCC 805 and the ADC 807 may be separated by a second AM 806. The ADC 807 typically includes therein a homogeneous volume of anion exchange material. The ADC 807 may be separated from a cathode chamber 809 by a third AM 808. The cathode chamber 809 typically includes a cathode therein. The apparatus as illustrated in FIG. 8 may be operated in continuous mode or in intermittent mode.

In FIG. 8, the majority of the contaminant ions may be drawn into the CBCC 805. The ACBDC 803 may serve as the final ion depletion chamber. As the product liquid passes through the ACBDC 803, residual contaminant anions may be removed into the anode chamber 801. Since the majority of contaminant anions may be removed by the ADC 807, the trace amounts of residual anions removed by the ACBDC 803 and into the anode chamber 801 will not cause significant electrode degradation.

A method for performing electrodeionization utilizing the apparatus as illustrated in FIG. 8 comprises first causing the liquid to be deionized to flow through the ADC 807. The interaction between the liquid and the ADC 807 may be maximized by placing the inlet to the ADC 807 near the second AM 806 and the outlet of the ADC 807 near the third AM 808. This causes the liquid to traverse the length of the ADC 807 as it flows from the inlet to the outlet. The ADC 807 may be capable of effectively removing contaminant anions from the liquid stream. The anions are attracted to the anode under the influence of the applied electric field and may be allowed to pass through a second AM 806 and into the CBCC 805. The contaminant anions may be removed from the system in the CBCC 805. The anions are not allowed to pass through a CM 804 that defines the anode-side of the CBCC 805. The anions cannot travel toward the cathode because of the influence of the applied electric field. Therefore, the anions may be effectively contained in the CBCC 805 until they are flushed from the system by the waste liquid stream that removes ions from the CBCC 805. The liquid exiting the ADC 807 may be largely free of anionic contamination.

Following the passage through 807, the liquid is then flowed through the ACBDC 803. The interaction between the liquid and the ACBDC 803 may be maximized by placing the inlet to the ACBDC 803 near the CM 804 and the outlet of the ACBDC 803 near the first AM 802. This causes the liquid to traverse the length of the ACBDC 803 as it flows from the inlet to the outlet. The ACBDC 803 may be capable of removing both anions and cation. The remaining anions are attracted to the adjacent anode chamber 801 under the influence of the applied electric field and may be allowed to pass through a first AM 802 and may be removed from the liquid. The cations are attracted toward the cathode under the influence of the applied electric field and may be allowed to pass through a CM 804 into the adjacent CBCC 805. The contaminant cations may be removed from the system in the CBCC 805. The cations are not allowed to pass through a second AM 806 that defines the cathode-side of the CBCC 805. The cations cannot travel toward the anode because of the influence of the applied electric field. Therefore, the cations may be effectively removed in the CBCC 805 until they are flushed from the system by the waste liquid stream that removes ions from the CBCC 805. The liquid exiting the ACBDC 803 may have a reduced level of both anions and cations relative to the in-coming liquid stream.

Water splitting occurs in the ACBDC 803 since it may include therein a mixed ion exchange material, or a doped anion exchange material, or a doped cation exchange material. The water splitting in the ACBDC 803 may serve to regenerate the first AM 802 that separates the ACBDC 803 from the anode chamber 801 as well as the CM 804 that separates the ACBDC 803 from the adjacent CBCC 805.

The apparatus and method of use illustrated in FIG. 8 address the electrode fouling and ion exchange degradation problems since the electrode chambers may receive a reduced quantity of the contaminant ions and water splitting in the composite bed depletion chambers generates hydronium and hydroxide ions for the regeneration of the anion membranes, and cation membranes.

The foregoing descriptions of exemplary embodiments of the present invention have been presented for the purpose of illustration and description. They are not intended to be exhaustive or to limit the present invention to the precise forms disclosed, and obviously many modifications, embodiments, and variations are possible in light of the above teaching.

What is claimed is:

1. An electrodeionization device which enables a fluid flow pattern which directs ionic contaminants away from processing chambers which contain electrodes, said device consisting essentially of seven processing chambers and six ion exchange membranes, as follows:
    a) a cathode chamber 213 contiguous with a first cation membrane 212;
    b) an anode chamber 201 contiguous with a first anion membrane 202;
    c) a first mixed or doped bed 211 which is contiguous with said first cation membrane 212 and with a third anion membrane 210;
    d) a second mixed or doped bed 203 which is contiguous with said first anion membrane 202 and with a third cation membrane 204;
    e) an anion bed 209 which is contiguous with said third anion membrane 210 and with a second anion membrane 208;
    f) a cation bed 205 which is contiguous with said third cation membrane 204 and with a second cation membrane 206; and
    g) a central composite concentrate chamber 207 which is contiguous with said second cation membrane 206 and with said second anion membrane 208.

2. An electrodeionization device in accordance with claim 1, wherein said first mixed or doped bed 211 is a mixed bed filled with a mixture of anion and cation exchange materials, wherein the anion exchange material makes up from about 40% to about 60% of the total ion exchange capacity, and the cation exchange material makes up the remainder of the total ion exchange capability, and wherein said second mixed or doped bed 203 is a mixed bed filled with a mixture of anion and cation exchange materials, wherein the anion exchange material makes up from about 40% to about 60% of the total ion exchange capacity, and the cation exchange material makes up the remainder of the total ion exchange capability.

3. An electrodeionization device in accordance with claim 1, wherein said first mixed or doped bed 211 is a mixed bed filled with a mixture of anion and cation exchange materials, wherein the cation exchange material makes up from about 40% to about 60% of the total ion exchange capability, and the anion exchange material makes up the remainder of the total ion exchange capability, and wherein said second mixed or doped bed 203 is a mixed bed filled with a mixture of anion and cation exchange materials, wherein the cation exchange material makes up from about 40% to about 60% of the total ion exchange capability and the anion exchange material makes up the remainder of the total ion exchange capability.

4. An electrodeionization device in accordance with claim 1, wherein said first mixed or doped bed 211 is a mixed bed filled with a mixture of anion and cation exchange materials where the cation exchange material makes up about 40% to about 60% of the total ion exchange capability, and the anion exchange material makes up the remainder of the total ion exchange capability, and wherein said second mixed or doped bed 203 is a mixed bed filled with a mixture of anion and cation exchange materials where the anion exchange material makes up about 40% to about 60% of the total ion exchange capability, and the cation exchange material makes up the remainder of the total ion exchange capability.

5. An electrodeionization device in accordance with claim 1, wherein said first mixed or doped bed 211 is a mixed bed filled with a mixture of anion and cation exchange materials where the anion exchange material makes up about 40% to about 60% of the total ion exchange capability, and the cation exchange material makes up the remainder of the total ion exchange capability, and wherein said second mixed or doped bed 203 is a mixed bed filled with a mixture of anion and cation exchange materials where the cation exchange material makes up about 40% to about 60% of the total ion exchange capability, and the anion exchange material makes up the remainder of the total ion exchange capability.

6. An electrodeionization device in accordance with claim 2, or claim 3, or claim 4, or claim 5, wherein said central composite concentrate chamber 207 is a mixed bed filled with a mixture of anion and cation exchange material, where either the anion exchange material or the cation exchange material makes up about 40% to about 60% of the total ion exchange capability.

7. An electrodeionization device in accordance with claim 1, wherein said first mixed or doped bed 211 is a doped bed filled with doped cation exchange material which is responsible for at least about 60% of the total ion exchange capacity and the remainder of the total ion exchange capability is contributed by anion exchange material, and wherein said second mixed or doped bed 203 is a doped bed filled with doped cation exchange material which is responsible for at least about 60% of the total ion exchange capacity and the remainder of the total ion exchange capability is contributed by anion exchange material.

8. An electrodeionization device in accordance with claim 1, wherein said first mixed or doped bed 211 is a doped bed filled with doped anion exchange material which is responsible for at least about 60% of the total ion exchange capacity and the remainder of the total ion exchange capability is contributed by cation exchange material, and wherein said second mixed or doped bed 203 is a doped bed filled doped anion exchange material which is responsible for at least about 60% of the total ion exchange capacity and the remainder of the total ion exchange capability is contributed by cation exchange material.

9. An electrodeionization device in accordance with claim 1, wherein said first mixed or doped bed 211 is a doped bed filled with doped cation exchange material which is responsible for at least about 60% of the total ion exchange capacity and the remainder of the total ion exchange capability is contributed by cation exchange material and wherein said second mixed or doped bed 203 is a doped bed filled with doped anion exchange material which is responsible for at least about 60% of the total ion exchange capacity and the remainder of the total ion exchange capability is contributed by cation exchange material.

10. An electrodeionization device in accordance with claim 1, wherein said first mixed or doped bed 211 is a doped bed filled with doped anion exchange material which is responsible for at least about 60% of the total ion exchange capacity and the remainder of the total ion exchange capability is contributed by cation exchange material and wherein said second mixed or doped bed 203 is a doped bed filled with doped cation exchange material which is responsible for at least about 60% of the total ion exchange capacity and the remainder of the total ion exchange capability is contributed by anion exchange material.

11. An electrodeionization device in accordance with claim 7, or claim 8, or claim 9, or claim 10, wherein said central composite concentrate chamber 207 is a mixed bed filled with a mixture of anion and cation exchange material where either the anion exchange material or the cation exchange material makes up about 40% to about 60% of the total ion exchange capability.

12. A method of using an electrodeionization device where the device is in accordance with claim 11, and wherein a liquid feed stream into said device enters into cation bed 205, flows through cation bed 205, flows directly from cation bed 205 into anion bed 209, flows through anion bed 209, exits anion bed 209 and flows directly into first mixed or doped bed 211, flows through first mixed or doped bed 211, exits first mixed or doped bed 211 and flows directly into second mixed or doped bed 203, flows through second mixed or doped bed 203, and the finished product exits second mixed or doped bed 203.

13. A method in accordance with claim 12, wherein it is desired to produce a purified liquid feed stream which contains fewer cations than anions, and at least second mixed or doped bed 203 is filled with a doped cation exchange material which is responsible for at least about 60% of the total ion exchange capacity of second mixed or doped bed 203, and the remainder of the total ion exchange capability of second mixed or doped bed 203 is contributed by anion exchange material.

14. A method in accordance with claim 12, wherein it is desired to produce a purified liquid feed stream which contains fewer anions than cations, and at least second mixed or doped bed 203 is filled with a doped anion exchange material which is responsible for at least about 60% of the total ion exchange capacity of second mixed or doped bed 203, and the remainder of the total ion exchange capability of second mixed or doped bed 203 is contributed by cation exchange material.

\* \* \* \* \*